(12) United States Patent
Seregin et al.

(10) Patent No.: US 11,356,707 B2
(45) Date of Patent: Jun. 7, 2022

(54) SIGNALING FILTERS FOR VIDEO PROCESSING

(71) Applicant: QUALCOMM Incorporated, San Diego, CA (US)

(72) Inventors: Vadim Seregin, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/024,614

(22) Filed: Sep. 17, 2020

(65) Prior Publication Data

US 2021/0092458 A1 Mar. 25, 2021

Related U.S. Application Data

(60) Provisional application No. 62/904,629, filed on Sep. 23, 2019.

(51) Int. Cl.
*H04N 19/82* (2014.01)
*H04N 19/187* (2014.01)
*H04N 19/58* (2014.01)

(52) U.S. Cl.
CPC ........... *H04N 19/82* (2014.11); *H04N 19/187* (2014.11); *H04N 19/58* (2014.11)

(58) Field of Classification Search
CPC .... H04N 19/59; H04N 19/463; H04N 19/187; H04N 19/82; H04N 19/58; H04N 19/132; H04N 19/172
See application file for complete search history.

(56) References Cited

U.S. PATENT DOCUMENTS

| | | | | |
|---|---|---|---|---|
| 5,648,987 A | * | 7/1997 | Yang | H04L 25/03038 375/232 |
| 2003/0169931 A1 | * | 9/2003 | Lainema | H04N 19/196 375/E7.193 |
| 2008/0247467 A1 | * | 10/2008 | Rusanovskyy | H04N 19/63 375/E7.076 |
| 2009/0010331 A1 | * | 1/2009 | Jeon | H04N 19/174 375/E7.243 |
| 2009/0232204 A1 | * | 9/2009 | Lee | H04N 19/146 375/E7.076 |
| 2010/0098345 A1 | * | 4/2010 | Andersson | H04N 19/194 382/238 |
| 2013/0094569 A1 | * | 4/2013 | Chong | H04N 19/82 375/240.02 |

(Continued)

*Primary Examiner* — Zaihan Jiang
(74) *Attorney, Agent, or Firm* — Polsinelli

(57) ABSTRACT

Systems, methods, and computer-readable storage media for signaling filters for reference picture resampling are described. One example involves obtaining an encoded video bitstream associated with the video data, identifying a current picture and at least one reference picture from the encoded video bitstream, and identifying signaling data from the encoded video bitstream for the video data, the signaling data including a partial set of coefficient data for at least one filter. A complete set of coefficients (e.g., filter coefficients) is derived for the at least one filter from the partial set of coefficient data and characteristics of the at least one filter, and the current picture is processed using the complete set of coefficients for the at least one filter.

28 Claims, 11 Drawing Sheets

(56) References Cited

U.S. PATENT DOCUMENTS

| | | | | |
|---|---|---|---|---|
| 2014/0064386 A1* | 3/2014 | Chen | ................ | H04N 19/30 |
| | | | | 375/240.29 |
| 2014/0092999 A1* | 4/2014 | Dong | ................ | H04N 19/70 |
| | | | | 375/240.29 |
| 2014/0328387 A1* | 11/2014 | Puri | ................ | H04N 19/136 |
| | | | | 375/240.02 |
| 2014/0369426 A1* | 12/2014 | Li | ................ | H04N 19/186 |
| | | | | 375/240.29 |
| 2015/0382009 A1* | 12/2015 | Chen | ................ | H04N 19/523 |
| | | | | 375/240.16 |
| 2017/0155911 A1* | 6/2017 | Lin | ................ | H04N 19/159 |
| 2017/0223352 A1* | 8/2017 | Kim | ................ | H04N 19/13 |
| 2017/0238020 A1* | 8/2017 | Karczewicz | ................ | H04N 19/82 |
| | | | | 375/240.29 |
| 2017/0244962 A1* | 8/2017 | Roskowski | ................ | H04N 7/188 |
| 2019/0045214 A1* | 2/2019 | Ikai | ................ | H04N 19/105 |
| 2019/0052911 A1* | 2/2019 | Zhang | ................ | H04N 19/82 |
| 2019/0394464 A1* | 12/2019 | Stepin | ................ | H04N 19/154 |
| 2020/0244965 A1* | 7/2020 | Sychev | ................ | H04N 19/176 |

\* cited by examiner

SIGNALING FILTERS FOR VIDEO PROCESSING

CROSS-REFERENCE TO RELATED APPLICATIONS

This application claims the benefit of U.S. Provisional Application No. 62/904,629, filed Sep. 23, 2019 and titled "SIGNALING FILTERS FOR REFERENCE PICTURE RESAMPLING" which is hereby incorporated by reference in its entirety and for all purposes.

TECHNICAL FIELD

This application is related to video coding and compression. More specifically, this application relates to systems and methods of signaling filters for video processing.

BACKGROUND

Many devices and systems allow video data to be processed and output for consumption. Digital video data generally includes large amounts of data to meet the demands of video consumers and providers. For example, consumers of video data desire video of high quality, fidelity, resolution, frame rates, and the like. As a result, the large amount of video data that is required to meet these demands places a burden on communication networks and devices that process and store the video data.

Various video coding techniques may be used to compress video data. Video coding techniques can be performed according to one or more video coding standards. For example, video coding standards include high-efficiency video coding (HEVC), advanced video coding (AVC), moving picture experts group (MPEG) 2 part 2 coding, VP9, Alliance of Open Media (AOMedia) Video 1 (AV1), Essential Video Coding (EVC), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with improved coding accuracy or efficiency are needed.

SUMMARY

Systems and methods are described herein for improved video processing. In some examples, video coding techniques are described that use prediction to encode and decode video data efficiently. For example, a video encoder can perform prediction for a current block being encoded by comparing pixel values in the current block to a prediction block (e.g., a block that has not been encoded or that has been previously decoded). A prediction error (also referred to as the residual) can be determined as a difference between the current block and the prediction block. When performing prediction for a block of a picture using one or more blocks from one or more other pictures (referred to as inter-prediction), a motion vector can be used to indicate a location of a prediction block relative to the current block. The video encoder can apply a transform to the prediction error (e.g., a discrete cosine transform (DCT) or other suitable transform) to generate transform coefficients. After transformation, the video encoder can quantize the transform coefficients. The quantized transform coefficients and motion vectors may be represented using syntax elements, and, along with control information, form a coded representation of a video sequence. In some instances, the video encoder can entropy code syntax elements, which can further reduce the number of bits needed for representing the syntax elements.

In some examples, motion prediction can be enhanced with an inter-prediction block merging technique to simplify block-based motion data signaling. Interpolation techniques can be used in such examples due to the displacement of objects between pictures (e.g., between a current picture and a reference picture) being independent of the pixel grid for the images. Fractional accuracy (e.g., estimating placement between pixels in images) can be used to more accurately capture motion. Interpolation filters can be used in video processing to implement fractional accuracy, particularly when the reference picture and the current picture being processed share a same size. Interpolation filters are used to filter image data to estimate image values at fractional positions, and the fractional position data can be used with prediction or other image processing operations.

Resampling refers to taking an image with certain samples (e.g., pixels in a certain grid), and modifying the samples (e.g., creating new pixels on a different grid) while maintaining data from the original samples. Resampling can include upsampling, where pixels from a lower resolution grid are used to create pixels in a higher resolution grid, as well as downsampling, where pixels from a higher resolution grid are used to generate pixels in a lower resolution grid. In the context of motion prediction and motion vectors described above, when the reference picture and the current picture being compared are of different sizes, reference picture resampling can be used to standardize the pixel grid as part of generating an image with fractional accuracy. When an image processing system is configured to allow reference pictures with a different size than a current picture, a filter indicated by a filter index can be suitable to process the images for interpolation filtering (e.g., fractional accuracy when the reference is a same size as a current picture) but not for fractional accuracy with reference picture resampling (e.g., fractional accuracy when the reference picture is a different size than a current picture). In some systems, for example, a smoothing filter used for fractional accuracy can generate good results with interpolation when the reference picture and the current picture are the same size, but can create poor results when used with reference picture resampling where the reference picture has a different pixel grid (e.g., a different size) than the current picture. Some examples described herein include decoding and encoding devices with operation of the devices improved by signaling filter coefficients based on characteristics of filters. In some cases, signaling filter coefficients based on characteristics of filters can allow a filter and a complete set of coefficients to be derived (e.g., by a decoding device) from the signaled coefficients. In some examples, the signaled coefficients can exclude some coefficients of the full filter.

In one illustrative example, a method of coding video data is provided. The method includes obtaining an encoded video bitstream associated with the video data; identifying a current picture and at least one reference picture from the encoded video bitstream; identifying signaling data from the encoded video bitstream for the video data, the signaling data including a partial set of coefficient data for at least one filter; deriving a complete set of coefficients for the at least one filter from the partial set of coefficient data and characteristics of the at least one filter; and processing the current picture using the complete set of coefficients for the at least one filter.

In another example, an apparatus is provided that includes a memory and one or more processors (e.g., configured in circuitry) coupled to the memory. The one or more processors are configured to: obtain an encoded video bitstream associated with the video data; identify a current picture and at least one reference picture from the encoded video bitstream; identify signaling data from the encoded video bitstream for the video data, the signaling data including a partial set of coefficient data for at least one filter; derive a complete set of coefficients for the at least one filter from the partial set of coefficient data and characteristics of the at least one filter; and process the current picture using the complete set of coefficients for the at least one filter.

In another example, a non-transitory computer-readable storage medium is provided that includes instructions stored thereon which, when executed by one or more processors, cause the one or more processors to: obtain an encoded video bitstream associated with the video data; identify a current picture and at least one reference picture from the encoded video bitstream; identify signaling data from the encoded video bitstream for the video data, the signaling data including a partial set of coefficient data for at least one filter; derive a complete set of coefficients for the at least one filter from the partial set of coefficient data and characteristics of the at least one filter; and process the current picture using the complete set of coefficients for the at least one filter.

In another example, an apparatus is provided that includes: means for obtaining an encoded video bitstream associated with the video data; means for identifying a current picture and at least one reference picture from the encoded video bitstream; means for identifying signaling data from the encoded video bitstream for the video data, the signaling data including a partial set of coefficient data for at least one filter; means for deriving a complete set of coefficients for the at least one filter from the partial set of coefficient data and characteristics of the at least one filter; and means for processing the current picture using the complete set of coefficients for the at least one filter.

In some aspects, deriving the complete set of coefficients comprises utilizing a filter norm and values of signaled filter coefficients from the partial set of coefficient data, where wherein the characteristics of the at least one filter include a non-symmetrical filter characteristic.

In some aspects, the characteristics of the at least one filter include a symmetrical filter characteristic, and deriving the complete set of coefficients comprises determining a plurality of missing coefficients from the partial set of coefficient data by mirroring coefficients from the partial set of coefficient data and calculating a filter norm.

In some aspects, the characteristics of the at least one filter include a fractional position characteristic, and deriving the complete set of coefficients comprises deriving fractional positions for missing coefficients and minoring coefficients present in the partial set of coefficient data.

In another example, a method is provided that includes: obtaining a current picture and at least one reference picture from the video data; selecting at least one filter with a set of filter coefficients based on the current picture and the at least one reference picture; generating signaling data for the at least one filter based on characteristics of the at least one filter, wherein the signaling data excludes data for at least one coefficient of the set of filter coefficients; and communicating the signaling data with an encoded video bitstream for the video data.

In another example, an apparatus is provided that includes a memory and one or more processors (e.g., configured in circuitry) coupled to the memory. The one or more processors are configured to: obtain a current picture and at least one reference picture from the video data; select at least one filter with a set of filter coefficients based on the current picture and the at least one reference picture; generate signaling data for the at least one filter based on characteristics of the at least one filter, wherein the signaling data excludes data for at least one coefficient of the set of filter coefficients; and communicate the signaling data with an encoded video bitstream for the video data.

In another example, a non-transitory computer-readable storage medium is provided that includes instructions stored thereon which, when executed by one or more processors, cause the one or more processors to: obtain a current picture and at least one reference picture from the video data; select at least one filter with a set of filter coefficients based on the current picture and the at least one reference picture; generate signaling data for the at least one filter based on characteristics of the at least one filter, wherein the signaling data excludes data for at least one coefficient of the set of filter coefficients; and communicate the signaling data with an encoded video bitstream for the video data.

In another example, an apparatus is provided that includes: means for obtaining a current picture and at least one reference picture from the video data; means for selecting at least one filter with a set of filter coefficients based on the current picture and the at least one reference picture; means for generating signaling data for the at least one filter based on characteristics of the at least one filter, wherein the signaling data excludes data for at least one coefficient of the set of filter coefficients; and means for communicating the signaling data with an encoded video bitstream for the video data.

In some aspects, generating the signaling data includes storing coefficient data for the at least one filter in an adaptation parameter set (APS).

In some aspects the coefficient data includes a plurality of coefficients for the at least one filter and a norm value for all coefficients of a first filter.

In some aspects the coefficient data includes a difference between an absolute value of each coefficient of the set of filter coefficients and an absolute value of corresponding previously signaled coefficients.

In some aspects communicating the signaling data includes communicating the signaling data as part of a picture header in the encoded video bitstream for the video data.

In some aspects the characteristics of at the least one filter include a non-symmetrical characteristic. In some such aspects the at least one coefficient of the set of filter coefficients excluded from the signaling data is a largest value coefficient of the set of filter coefficients.

In some aspects, the characteristics of the at least one filter include a symmetrical characteristic. In some such aspects, the set of filter coefficients includes N coefficients, and wherein the signaling data excludes data for N/2+1 coefficients of the set of filter coefficients from the signaling data.

In some aspects, selecting the at least one filter with the set of filter coefficients is based on whether filtering in either a horizontal or a vertical directions or both for the current picture and the at least one reference picture is downsampling, upsampling, or regular motion compensation.

In some aspects, deriving the complete set of coefficients comprises calculating a filter norm using on the partial set of coefficient data; where the characteristics of the at least one filter include a non-symmetrical filter characteristic.

In some aspects, the characteristics of the at least one filter include a symmetrical filter characteristic, and where deriving the complete set of coefficients comprises determining a plurality of missing coefficients from the partial set of coefficient data by mirroring coefficients from the partial set of coefficient data and calculating a filter norm.

In some aspects, the characteristics of the at least one filter include a fractional position characteristic; where deriving the complete set of coefficients comprises deriving fractional positions for missing coefficients and mirroring coefficients present in the partial set of coefficient data.

In some aspects, the apparatuses described above can include a mobile device with a camera for capturing one or more pictures. In some aspects, the apparatuses described above can include a display for displaying one or more pictures. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
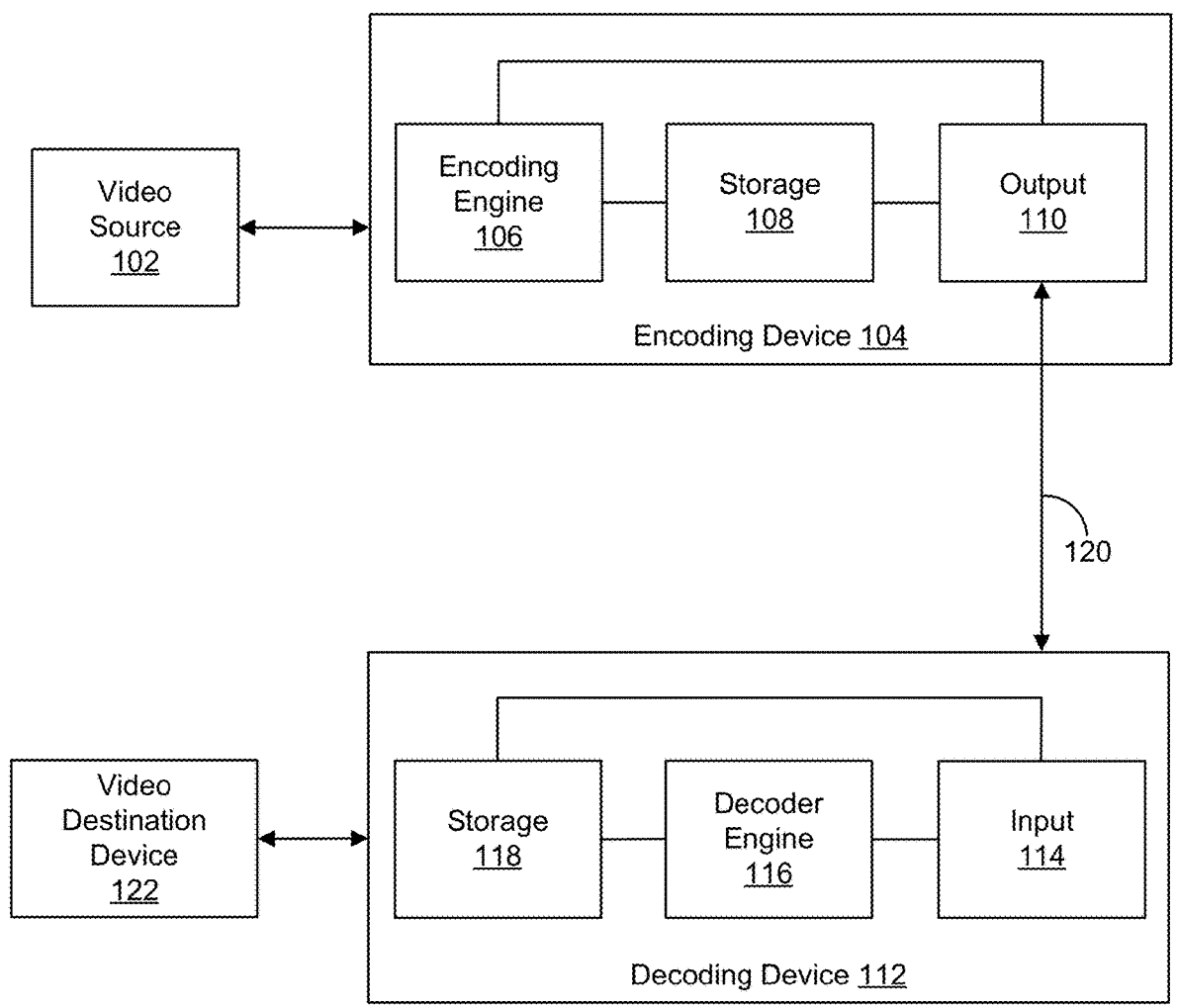
FIG. 1 is a block diagram illustrating an example of a system including an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Certain coding schemes can implement reference picture resampling (RPR), which allows a current picture and a reference picture(s) to have different resolutions. Resampling refers to taking pixel values from one image and "resampling" the data from the pixel values to generate new pixel values for a new image. As described above, resampling can include downsampling, where pixel values from a higher resolution image are used to generate an image at a lower resolution, as well as upsampling, where pixel values from a lower resolution image are used to generate an image at a higher resolution. In the context of motion prediction described above, references images and current images with different sizes (e.g., resolutions) can be used to generate motion vectors and perform motion prediction. Resampling can be used in such situations to manage the scaling difference between the reference picture and the current picture.

With RPR, in motion compensation the difference in picture resolutions can be considered during interpolation filtering by adjusting the interpolation filter phase and reference block start position. The scaling ratio can be derived for horizontal and vertical directions based on the current picture and reference picture widths and heights, and the current picture and reference picture conformance windows.

In some examples, interpolation techniques can be used based on the displacement of objects between pictures being independent of the pixel grid for the images. As described above, fractional accuracy (e.g., estimating placement between pixels in images) can be used to more accurately capture motion. Fractional accuracy can allow inference of motion data from previously decoded blocks. For interpolation and fractional reference picture samples, high precision can improve filtering. Example systems can support motion vectors with quarter-pixel accuracy, one-eighth pixel accuracy, one-sixteenth pixel accuracy, or other such accuracy depending on the system. In some examples, luma and chroma components can have different fractional accuracy in the same system. Interpolation filters can be used to process images in this context. Additionally, multiple different interpolation filters can be used in different situations (e.g., based on motion vector values). Selecting between different interpolation filters that are available is referred to herein as interpolation filter switching.

In some examples, the variables PicOutputWidthL and PicOutputHeightL, corresponding to a picture width and a picture height, can be derived for luma samples as follows:

$$\text{PicOutputWidth}L=\text{pic\_width\_in\_luma\_samples}-\text{SubWidth}C*(\text{conf\_win\_right\_offset}+\text{conf\_win\_left\_offset}) \quad \text{Equation (1)}$$

$$\text{PicOutputHeight}L=\text{pic\_height\_in\_luma\_samples}-\text{SubHeight}C*(\text{conf\_win\_bottom\_offset}+\text{conf\_win\_top\_offset}) \quad \text{Equation (2)}$$

The PicOutputWidthL and PicOutputHeightL can be calculated for a current picture and a reference picture. Moreover, pic_width_in_luma_samples and pic_height_in_luma_samples can refer to the width and height of a picture (e.g., a current picture, a reference picture, a decoded picture, an output picture, etc.) in units of luma samples, SubWidthC can correspond to a horizontal scaling factor (e.g., one or more samples, one or more pixels, one or more coding units, one or more partitions, etc.), SubHeightC can correspond to a vertical scaling factor (e.g., one or more samples, one or more pixels, one or more coding units, one or more partitions, etc.), and conf_win_right_offset, conf_win_left_offset, conf_win_bottom_offset, conf_win_top_offset can refer to the left, right, bottom and top offsets in a conformance window, which can define a window size of a decoded picture output.

The scaling ratio, which in some examples can be used to scale the motion vector and/or ensure the motion vector uses the correct coordinates of a picture, can be derived as follows:

$$\text{hori\_scale\_}fp=((f\text{RefWidth}<<14)+(\text{PicOutputWidth}L>>1))/\text{PicOutputWidth}L \quad \text{Equation (3)}$$

$$\text{vert\_scale\_}fp=((f\text{RefHeight}<<14)+(\text{PicOutputHeight}L>>1))/\text{PicOutputHeight}L \quad \text{Equation (4)}$$

PicOutputWidthL and PicOutputHeightL can be the picture width and height variables derived for a picture. In some examples, in Equations (3) and (4), PicOutputWidthL and PicOutputHeightL can correspond to the width and height of the current picture. Moreover, the variable fRefWidth can be set equal to the PicOutputWidthL of the reference picture in luma samples, and the variable fRefHeight can be set equal to PicOutputHeightL of the reference picture in luma samples.

The starting position (top left corner) of a block in a reference picture, denoted as (xIntL, yIntL), and a filter phase or an offset given in 1/16-sample units, denoted as (xFracL, yFracL), can be derived as follows. Given (refxSb$_L$, refySb$_L$) and (refx$_L$, refy$_L$) representing luma locations pointed to by a motion vector (refMvLX[0], refMvLX[1]) given in 1/16-sample units, the variables refxSb$_L$, refx$_L$, refySb$_L$, and refy$_L$ can be derived as follows:

$$\text{refxSb}_L=((xSb<<4)+\text{refMvLX}[0])*\text{hori\_scale\_}fp \quad \text{Equation (5)}$$

$$\text{refx}_L=((\text{Sign}(\text{refxSb})*((\text{Abs}(\text{refxSb})+128)>>8)+x_L*((\text{hori\_scale\_}fp+8)>>4))+32)>>6 \quad \text{Equation (6)}$$

$refySb_L = ((ySb<<4) + refMvLX[1]) * vert\_scale\_fp$  Equation (7)

$refyL = ((Sign(\ refySb) * ((Abs(\ refySb) + 128)>>8) + yL*((vert\_scale\_fp + 8) >>4))+32) >>6$  Equation (8)

The variables $xInt_L$, $yInt_L$, $xFrac_L$ and $yFrac_L$ can also be derived as follows:

$xInt_L = refx_L >> 4$  Equation (9)

$yInt_L = refy_L >> 4$  Equation (10)

$xFrac_L = refx_L \& 15$  Equation (11)

$yFrac_L = refy_L \& 15$  Equation (12)

where (xSb, ySb) can specify the top-left sample of the current coding subblock relative to the top-left luma sample of the current picture, and refMvLX can be a motion vector for a reference picture list LX (X is 0 and 1).

Equations (1) through (12) are described above with respect to luma samples. However, Equations (1) through (12) described above can be implemented and/or repeated for chroma color components. The process described above for calculating and using picture width and height, the scaling ratio, and location, sample and motion vector information can be repeated for chroma components with some variation to address particular video processing configurations for the particular part of the image data. Some examples can use 32 filter phases (e.g. inter-pixel positions) for chroma and 16 filter phases for luma. Other examples can have other numbers of filter phases for chroma and luma. Table 1 and table 2 are show filters and the set of corresponding coefficients for each filter in accordance with some examples.

TABLE 2

| Fractional sample position | Interpolation filter coefficients | | | |
|---|---|---|---|---|
| | $f_C[\ p\ ][\ 0\ ]$ | $f_C[\ p\ ][\ 1\ ]$ | $f_C[\ p\ ][\ 2\ ]$ | $f_C[\ p\ ][\ 3\ ]$ |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

Table 2 includes information associated with 32 filters for 32 chroma filter phases (e.g., chroma interpolation filter coefficients fC[p] for filters each 1/32 fractional sample position), each have a corresponding set of 4 filter coefficients denoted as fC[p][0], fC[p][1], fC[p][2], and fC[p][3].

TABLE 1

| Fractional sample position p | Interpolation filter coefficients | | | | | | | |
|---|---|---|---|---|---|---|---|---|
| | $f_L[\ p\ ][\ 0\ ]$ | $f_L[\ p\ ][\ 1\ ]$ | $f_L[\ p\ ][\ 2\ ]$ | $f_L[\ p\ ][\ 3\ ]$ | $f_L[\ p\ ][\ 4\ ]$ | $f_L[\ p\ ][\ 5\ ]$ | $f_L[\ p\ ][\ 6\ ]$ | $f_L[\ p\ ][\ 7\ ]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Table 1 includes information associated with 17 filters for 16 luma filter phases (e.g., luma interpolation filter coefficients fL[p] for filters at each 1/16 fractional sample position), each having a corresponding set of 8 filter coefficients denoted as fL[p][0], fL[p][1], fL[p][2], fL[p][3], fL[p][4], fL[p][5], fL[p][6], and fL[p][7]. The half-pel filter at fractional position 8 has two alternative filter options.

Some or all filters of tables 1 and 2 can be fixed, such that an encoding device 104 and a decoding device 112 can each store copies of these tables and the associated filters and filter coefficients. The local storage allows a filter that is pre-stored at a decoder to be used based on an index or another reference (e.g., included in the syntax signaled with a video bitstream) associated with the pre-stored filter rather than signaling the entire filter that is to be used. For reference picture resampling (e.g., upsampling or downsampling between a current picture and one or more reference pictures), regardless of the scaling ratio between the current picture and a given reference picture, an encoding device 104 and/or a decoding device 112 can use such fixed filters which can be pre-stored in the encoding device 104 and/or the decoding device 112. In some examples, the fixed filters are not the preferred filters for certain combinations of current pictures and reference pictures, as the fixed filters may not be efficient for some operations. In some examples, fixed filters may produce aliasing visual artifacts which are associated with lower image quality.

To address problems with using fixed filters, an encoding device (e.g., the encoding device 104) can include information (e.g., coefficient data) associated with "signaled" filters in a video bitstream. In some cases, to efficiently limit the data used for such filter signaling, some of the coefficients of a filter that is signaled are not included in the video bitstream. In such cases, characteristics of the filter can be used to limit the data that is included in the bitstream, and coefficient data that is included in the bitstream can be used by a receiving device (e.g., the decoding device 112) to derive the remaining coefficients. The partial signaling based on filter characteristics limits the amount of data signaled for the signaled filter while allowing a filter that is targeted to a particular situation to be sent in the video bitstream.

In some examples, the signaled filters may be selected for signaling by an encoding device 104 based on conditions existing between a current picture and one or more reference pictures. In some examples, the conditions used by encoding device 104 to select a particular filter can include whether the filtering in a horizontal, a vertical direction, or both the horizontal and vertical directions is downsampling (e.g., a reference picture width or height is larger than the current picture width or height). In some examples, the conditions can include whether the filtering in the horizontal and/or vertical directions is upsampling (e.g., a reference picture width or height is smaller than the current picture width or height). In some examples, the conditions can include whether the filtering in the horizontal and/or vertical directions is a regular motion compensation (e.g., a scaling ratio is 1 with the reference picture width or height equal to the current picture width or height). In some examples, other conditions can be used to determine which filter (e.g., signaled or fixed) to use.

In some examples, the signaled filters are applied according to specified criteria, with fixed filters used when a signaled filter is not used. In some examples, the signaled filters may be applied only for downsampling, and pre-existing motion compensation filters (e.g., fixed filters) may be applied for upsampling and regular motion compensation. In some examples, the signaled filters may be used for both downsampling and upsampling, and fixed motion compensation filters may be used for regular motion compensation (e.g., when a scaling ratio between a current picture and a reference picture is equal to one). In some examples, signaled filters may be used for downsampling, upsampling, and regular motion compensation. In some examples, the signaled filters may be used for downsampling and regular motion compensation, and fixed motion compensation filters may be used for upsampling. In other examples, other possible alternatives for the combination of the downsampling, upsampling, and regular motion compensation are used, such as the use of certain filters for certain downsampling or upsampling ratio thresholds not equal to one. For example, signaled filters can be used for certain downsampling operations, while fixed filters can be used for other downsampling operations. In some examples, for each type of filtering (e.g., downsampling, upsampling, regular, etc.), one or more filters can be signaled, or the filters can be signaled for a certain type, or a sub-group of circumstances for each type.

In some examples, certain filters can be used for certain downsampling or upsampling ratios. For example, one downsampling ratio between a current picture and a reference picture that is below a certain threshold can be associated with a first filter, and another downsampling ratio for a current picture and a reference picture that is above the certain threshold can be associated with a second different filter. Similarly, more than two filters can be assigned to downsampling if different ranges of ratios are each assigned to a different filter. Similarly, different filters can be assigned to different ranges of upsampling ratios between current pictures and reference pictures.

In some examples, characteristics other than or in addition to the scaling ratio can be used to determine which filter to apply. In some examples, an absolute picture size can be used to determine which filter to apply. In some cases, ranges of current picture sizes can be used to determine which filter to apply, such that certain size ranges have a set filter, and other size ranges use a different filter. In some examples, combinations of scaling ratios and picture sizes can be used. For example, a certain scaling ratio with a current picture at a first size can be associated with a filter. The same scaling ratio at a larger current picture size can be associated with a second filter, and the larger current picture size at a second scaling ratio can be associated with a third filter. In other examples, any such combination of characteristics can be used to assign filters in order to improve performance (e.g., improved throughput or image quality).

In some examples, the data for a signaled filter can be stored as part of a parameter set, such as an application parameter set (APS) and/or other parameter set (e.g., a picture parameter set (PPS), a sequence parameter set (SPS), video parameter set (VPS), etc.). For instance, a device can have configured storage for an APS. In some cases, a new APS type can be configured with an identifier to allow data for a signaled filter to be retrieved as part of an APS.

In some examples, the coefficients for a signaled filter can be stored for varying periods. Filters can be signaled at a different rate in different examples. In some examples, filters are signaled as needed and are stored for any future use in a video bitstream. In some examples, filters are signaled or re-signaled periodically, if needed. In some cases, periodically signaling or re-signaling filters can include signaling one or more filters per picture, per a given set of pictures, or for any other grouping of data as part of a video stream.

In some examples, a single current picture can be associated with multiple reference pictures. In some examples, each combination of a current picture and reference picture can have an associated filter, in which case a single current picture can have multiple associated signaled filters due to different characteristics of the reference pictures.

The techniques described herein can improve video processing device operations and can address various problems. For instance, the techniques described herein can address problems that occur when a mismatch exists between available fixed filters and filters that would provide improved performance for a given current picture and reference picture pair. In some examples, the above described use of signaled filters can improve the operation of video devices by improving the efficiency of filtering operations. Additionally, the use of signaled filters can, in some examples, improve the coding performance and quality of video data generated by an encoding device and/or a decoding device. For instance, such improvements can include improving the output video quality from an encoding device and/or a decoding device by reducing aliasing artifacts associated with lower quality video.

The techniques described herein can be applied to any of the existing video codecs (e.g., HEVC, AVC, or other suitable existing video codec), and/or can be an efficient coding tool for any video coding standards being developed and/or future video coding standards, such as, for example, VVC, the JEM, and/or other video coding standard in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, the system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore new coding tools for the next generation of video coding standard, named Versatile Video Coding (VVC). The reference software is called VVC Test Model (VTM) (or JEM (joint exploration model)). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video coding standards for which the techniques described herein can be applied.

VVC and/or other video coding standard in development or to be developed. For example, examples described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and the decoder engine 116 (described in more detail below) may be configured to operate according to VVC. According to VVC, a video coder (such as the encoder engine 106 and/or the decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. In some examples, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communication link 120 to the decoding device 112 of the receiving device. The input 114 of the decoding device 112 may receive the NAL units. The communication link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in a storage 108. The output 110 may retrieve the encoded video bitstream data from the encoder engine 106 or from the storage 108. The storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection, and may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to the storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 8. An example of specific details of the decoding device 112 is described below with reference to FIG. 9.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, one or more scaling window offsets can be included along with stored motion vectors in a MV candidate list.

In examples where a MV candidate list is used for motion prediction of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g., information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2B:
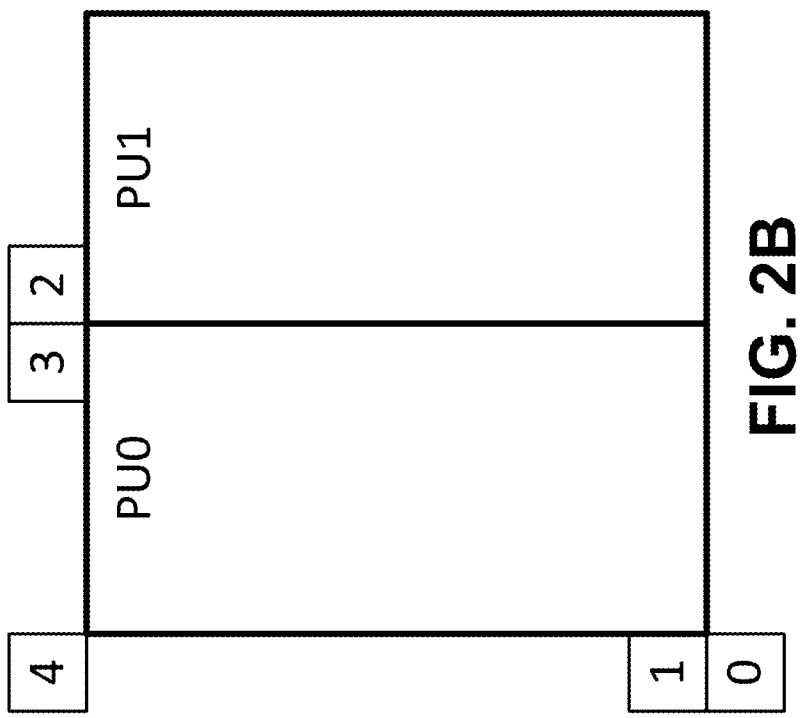
FIG. 2B is a conceptual diagram illustrating example spatial neighboring motion vector candidates for an advanced motion vector prediction (AMVP) mode, in accordance with some examples.
Figure 2A:
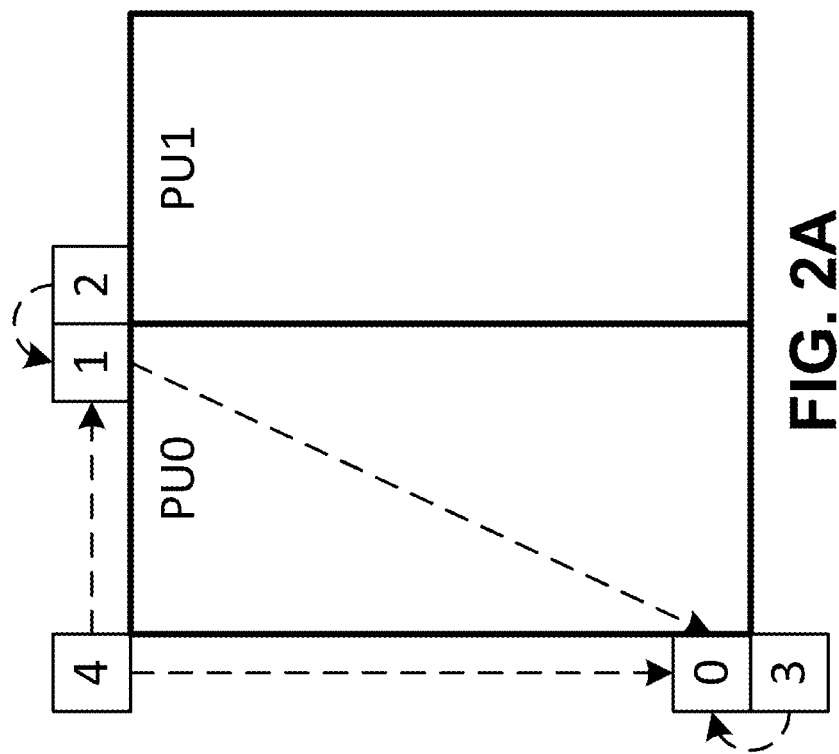
FIG. 2A is a conceptual diagram illustrating example spatial neighboring motion vector candidates for a merge mode, in accordance with some examples.

The candidates for both modes can be derived from spatial and/or temporal neighboring blocks. For example, FIG. 2A and FIG. 2B include conceptual diagrams illustrating spatial neighboring candidates. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder and/or decoder can form a merging candidate list by considering merging candidates from various motion data positions. For example, as shown in FIG. 2A, up to four spatial MV candidates can be derived with respect spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, and the temporal distance differences can be compensated.

Figure 3A:
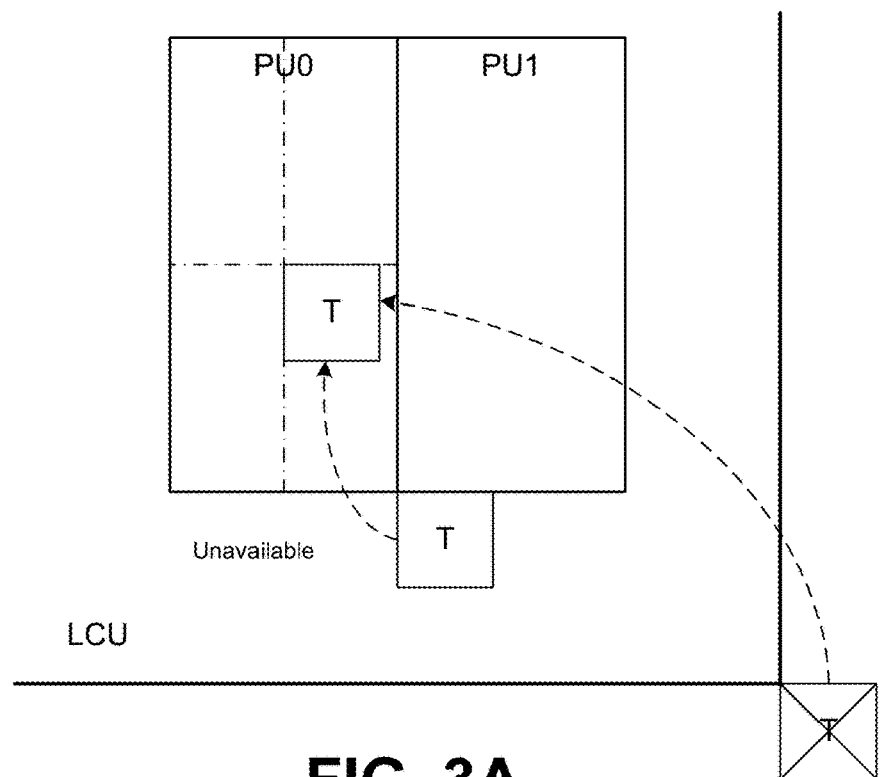
FIG. 3A is a conceptual diagram illustrating an example temporal motion vector predictor (TMVP) candidate, in accordance with some examples.
Figure 3B:
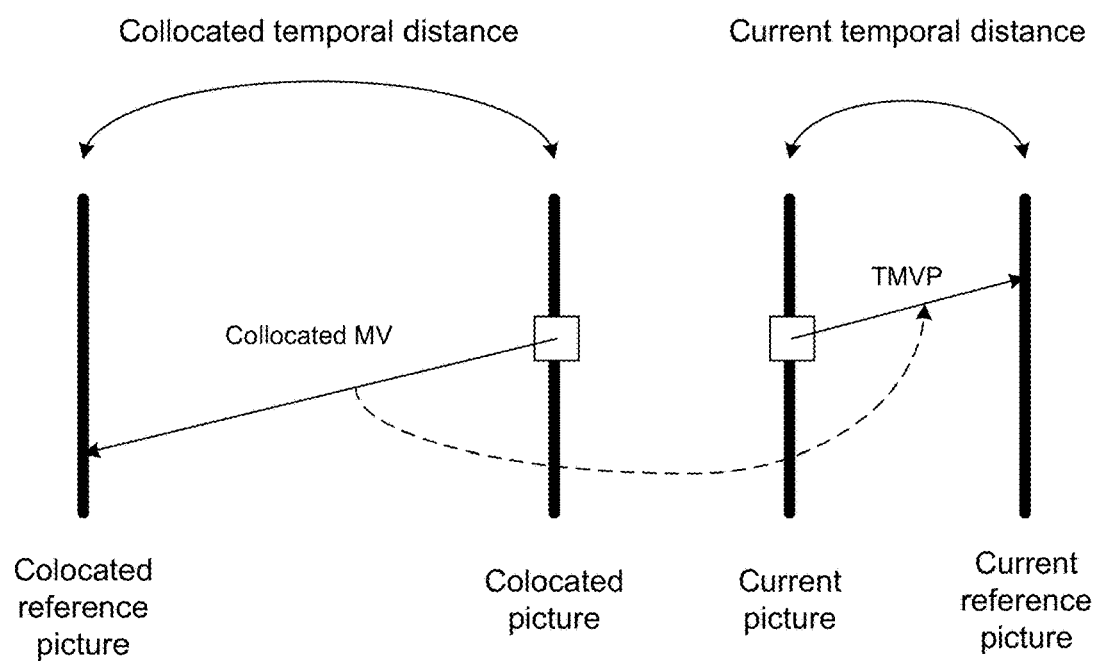
FIG. 3B is a conceptual diagram illustrating an example of motion vector scaling, in accordance with some examples.

FIG. 3A and FIG. 3B include conceptual diagrams illustrating temporal motion vector prediction. A temporal motion vector predictor (TMVP) candidate, if enabled and available, is added to a MV candidate list after spatial motion vector candidates. The process of motion vector derivation for a TMVP candidate is the same for both merge and AMVP modes. In some instances, however, the target reference index for the TMVP candidate in the merge mode can be set to zero or can be derived from that of the neighboring blocks.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And, the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

In some implementations, a pruning process can be performed when adding or inserting new candidates into an MV candidate list. For example, in some cases it is possible for MV candidates from different blocks to include the same information. In such cases, storing duplicative motion information of multiple MV candidates in the MV candidate list can lead to redundancy and a decrease in the efficiency of the MV candidate list. In some examples, the pruning process can eliminate or minimize redundancies in the MV candidate list. For example, the pruning process can include comparing a potential MV candidate to be added to an MV candidate list against the MV candidates which are already stored in the MV candidate list. In one illustrative example, the horizontal displacement ($\Delta x$) and the vertical displacement ($\Delta y$) (indicating a position of a reference block relative to a position of the current block) of a stored motion vector can be compared to the horizontal displacement ($\Delta x$) and the vertical displacement ($\Delta y$) of the motion vector of a potential candidate. If the comparison reveals that the motion vector of the potential candidate does not match any of the one or more stored motion vectors, the potential candidate is not considered as a candidate to be pruned and can be added to the MV candidate list. If a match is found based on this comparison, the potential MV candidate is not added to the MV candidate list, avoiding the insertion of an identical candidate. In some cases, to reduce complexity, only a limited number of comparisons are performed during the pruning process instead of comparing each potential MV candidate with all existing candidates.

Figure 4A:
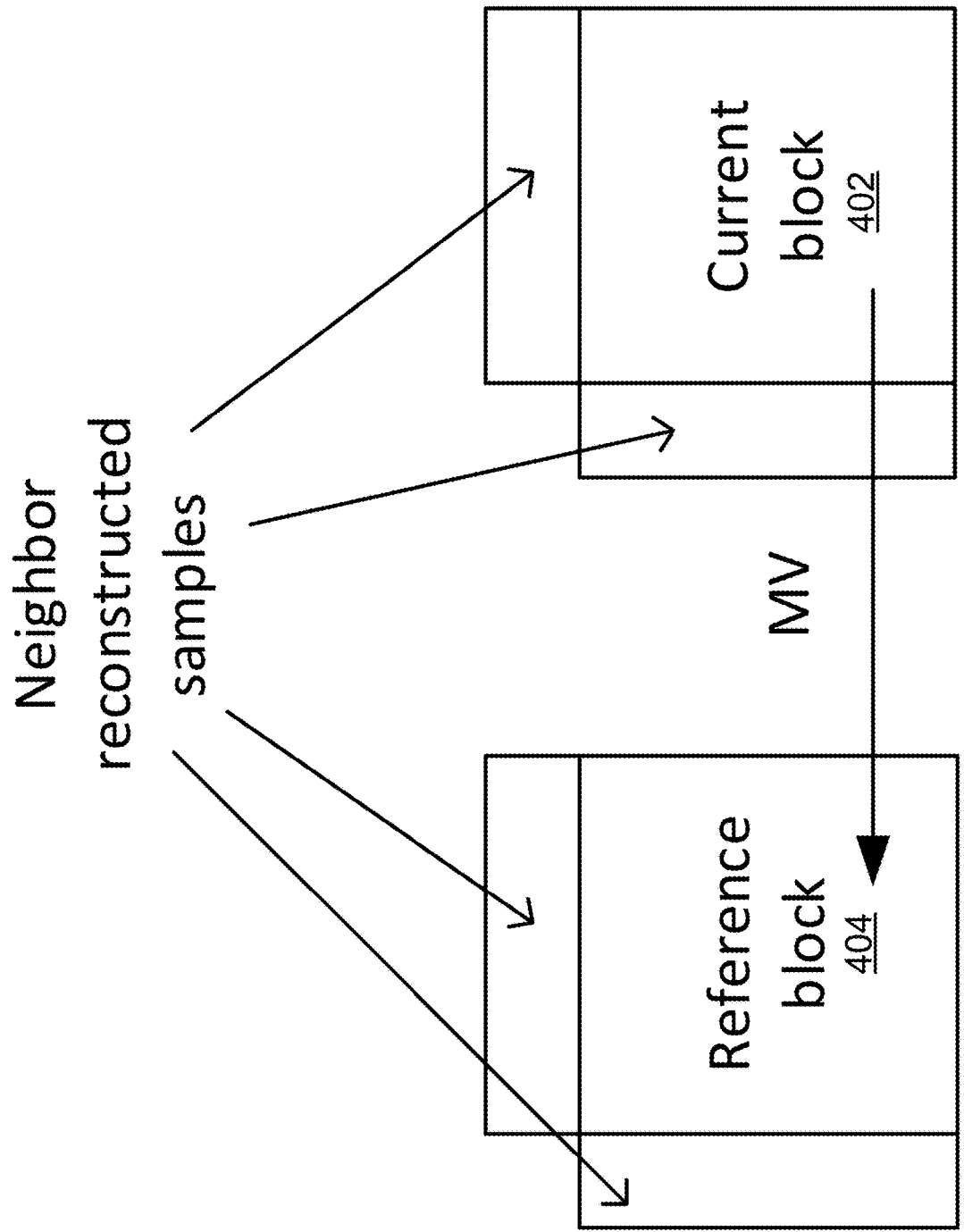
FIG. 4A is a conceptual diagram illustrating an example of neighboring samples of a current coding unit used for estimating motion compensation parameters for the current coding unit, in accordance with some examples.
Figure 4B:
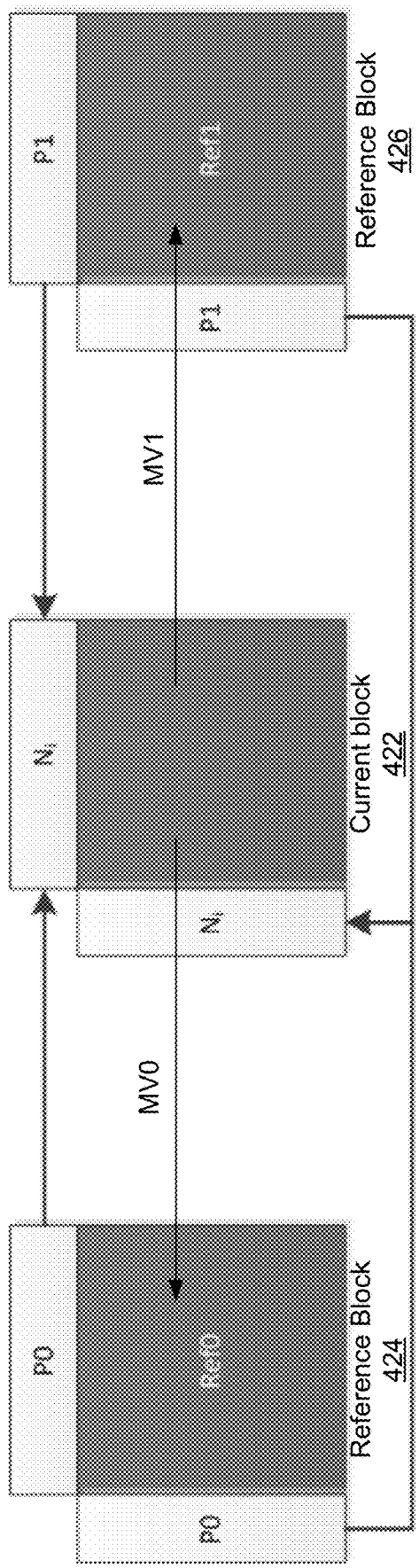
FIG. 4B is a conceptual diagram illustrating an example of neighboring samples of a reference block used for estimating motion compensation parameters for a current coding unit, in accordance with some examples.

FIG. 4A is a diagram illustrating an example of neighbor reconstructed samples of a current block 402 and neighbor samples of a reference block 404 used for uni-directional inter-prediction. A motion vector MV can be coded for the current block 402, where the MV can include a reference index to a reference picture list and/or other motion information for identifying the reference block 404. For example, the MV can include a horizontal and a vertical component that provides an offset from the coordinate position in the current picture to the coordinates in the reference picture identified by the reference index. FIG. 4B is a diagram illustrating an example of neighbor reconstructed samples of a current block 422 and neighbor samples of a first reference block 424 and a second reference block 426 used for bi-directional inter-prediction. In some examples, two motion vectors MV0 and MV1 can be coded for the current block 422 to identify the first reference block 424 and a second reference block 426, respectively.

In some cases, changes made to a reference picture and/or a current picture can result in different picture sizes and/or resolutions. For example, certain tasks, such as reference picture resampling (RPR), can result in current pictures and reference pictures with different resolutions.

Figure 5:
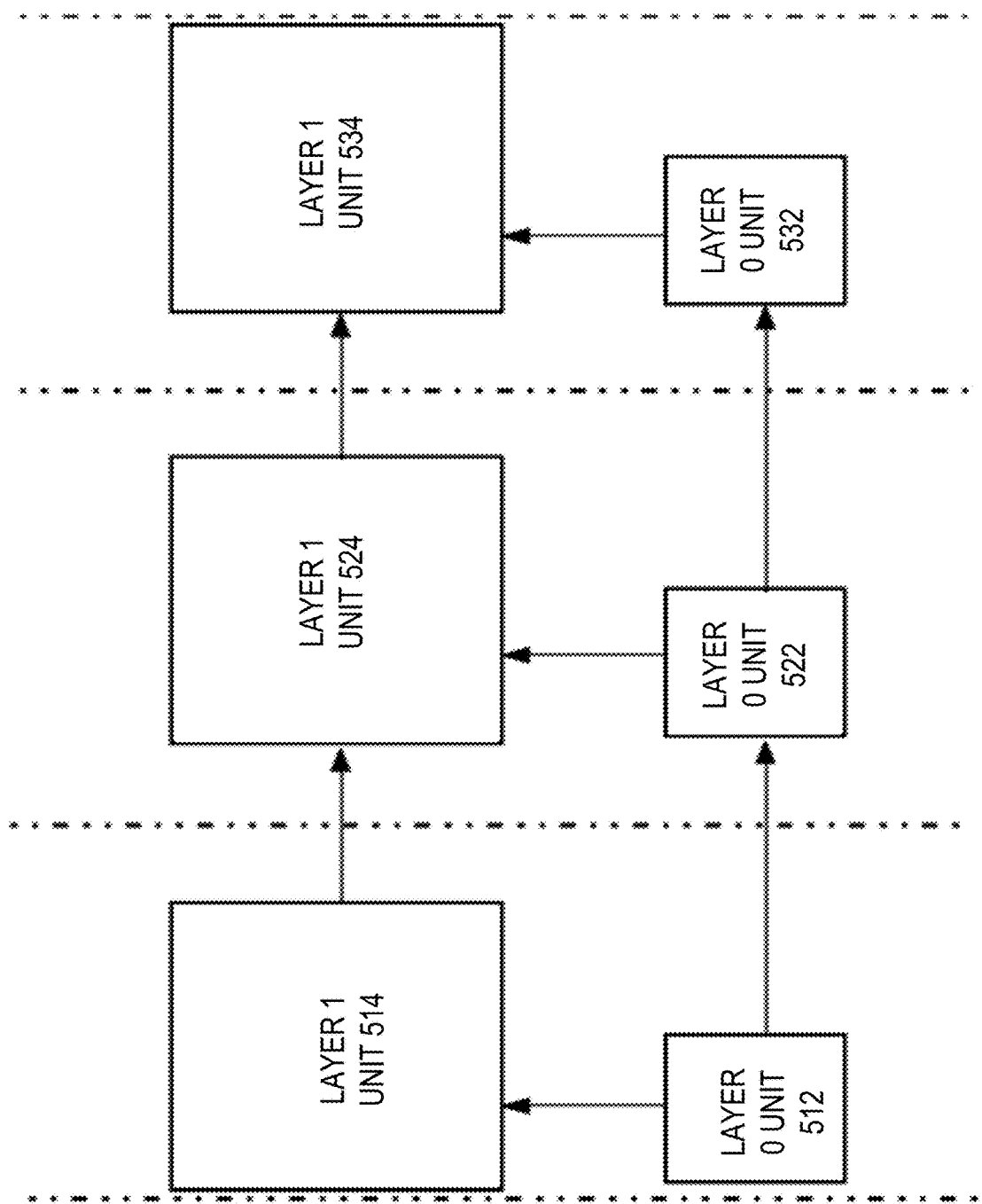
FIG. 5 is a conceptual diagram illustrating aspects of reference picture resampling, in accordance with some examples.

FIG. 5 is a conceptual diagram illustrating aspects of reference picture resampling in accordance with some examples. In particular, FIG. 5 illustrates aspects of picture data in a system at different scaling values (e.g., different sizes). Pictures or data for pictures (e.g., access units) can be structured in layers. Each layer can be for picture frames with different sizes (e.g., resolutions). One such example illustrated in FIG. 5 includes two layers, and other various examples can use other numbers of layers (e.g., three layers, four layers, etc.). In the example of FIG. 5, data for three pictures is shown, with each picture associated with two different picture sizes. A first picture is associated with a layer 1 unit 514 at a first picture size, and a layer 0 unit 512 at a second picture size. Similarly, a second picture is associated with a layer 1 unit 524 at the first picture size, and a layer 0 unit 522 at the second picture size, and a third picture is associated with a layer 1 unit 534 at the first picture size and a layer 0 unit 532 at the second picture size. During signaling, reference picture lists can be constructed to identify reference pictures for use in processing a current picture. In some examples, pictures from one layer (e.g., at the first resolution) can be used as reference pictures for a current picture at a second layer (e.g., at the second resolution).

With RPR, pictures (or blocks of the pictures) from layers other than a layer for a current picture can be used as reference pictures for blocks of the current picture. Such reference pictures can be stored in a decoded picture buffer (DPB) (e.g., using memory or reference picture storage such as a picture memory 92 for a filter unit such as a filter unit 91 of FIG. 9). A reference picture sampling tool can be used to generate the necessary reference data from the reference picture in the different layer for processing the current picture. In some examples, the reference picture sampling tool can be part of a filter unit (e.g., a filter unit 91 of FIG. 8), or in other examples can be part of any aspect of a device for encoding or decoding as described herein. Signaled filter data can be associated with a picture in the DPB with an identifier, such as a parameter set identifier that includes filter data (e.g., coefficients) for a filter associated with a current picture and a reference picture.

Mismatches between the available fixed filters and the performance available from other filters for a given current picture and reference picture combination can limit the performance of a video processing device. As described above, the mismatch can result in inefficiencies or video artifacts that reduce image quality. The techniques described herein for signaling filters can allow an improved match between a given current picture and reference picture pair, and the filter used to process the images in RPR.

Figure 6:
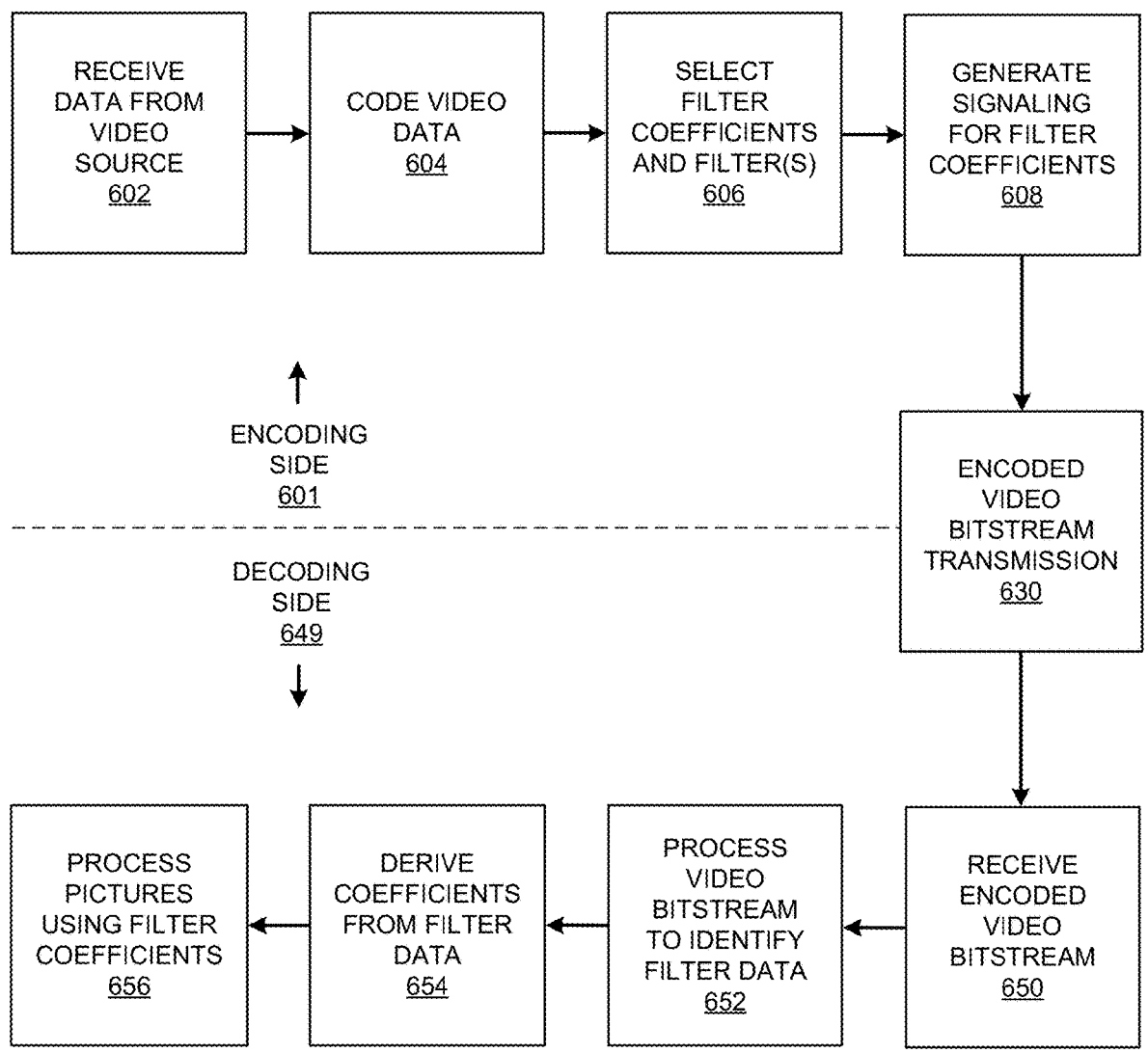
FIG. 6 is a flowchart illustrating a process of using signaled filters for reference picture resampling, in accordance with some examples.

FIG. 6 is a flowchart illustrating a process 600 of using signaled filters for reference picture resampling, in accordance with some examples. The process 600 of FIG. 6 includes operations for signaling filters (e.g., with reference picture resampling). In some examples, the process 600 can be implemented by the system 100, which can be configured to implement filter signaling in accordance with examples described herein. As described above, the system 100 includes an encoding side 601 with a video source 102 and an encoding device 104. The system 100 also includes a decoding side 649 with a decoding device 112 and a video destination device 122. According to the process 600, elements of the encoding device 104 can receive a video bitstream from the video source 102, and can implement filter signaling as described herein. The decoding device 112 can receive the encoded video bitstream data over the communication link 120. The decoding device 112 can identify signaling data for a filter signaled by the encoding device 104 in the video bitstream data. For example, the decoding device 112 can derive a full set of coefficients for a filter from the signaling data (e.g., which can include partial data based on characteristics of the filter), and can process pictures from the video bitstream using the signaled filter. In other examples, the process 600 can be structured as instructions of storage media of a system, where the instructions can cause devices of the system (e.g., the system 100) to perform the process 600.

At block 602, the process 600 receives video data from the video source 102. At block 604, the process 600 can begin encoding the video data. For example, the encoding device 104 can be configured to code the video data using any set of video coding operations or standards described above (e.g., VVC, etc.). The coding can include processing pictures as described above. During the video data coding, the encoding device 104 can associate current pictures with one or more reference pictures. The reference pictures can have a same size or a different size than the current pictures. As the video data coding proceeds, the encoding device 104 can include a sequence of encoded pictures into the encoded video bitstream data.

At block 606, the process 600 selects filter coefficients and filter(s). For example, after the one or more reference pictures are associated with a particular current block, the encoding device 104 can select a particular filter to be used for a given pair of pictures (e.g., each current picture and reference picture pair). In some cases, if a single current picture is associated with multiple reference pictures, the system can determine that a different signaled filter is to be used for the different reference pictures. In some examples, the encoding device 104 can select filter(s) and/or filter coefficients based on one or more factors. In some examples, the encoding device 104 can select between fixed filters that can be indicated by an index (e.g., as the filter data is known to be present in the decoding device 112), or signaled filters. In some examples, the encoding device 104 can select filter(s) and/or filter coefficients based on an analysis of the horizontal and/or vertical sizes of the current picture and a reference picture (e.g., using equations 1 and 2 above). In some examples, the encoding device 104 can perform the analysis and selection based on whether the filtering in the horizontal and/or vertical directions is downsampling. In some examples, the encoding device 104 can perform the analysis and selection based on whether the filtering in the horizontal and/or vertical directions is upsampling. In some examples, the encoding device 104 can perform the analysis and selection based on whether the filtering in the horizontal and/or vertical directions is a regular motion compensation due to the current picture and reference picture pair having the same size. As noted above, regular motion compensation can refer to motion compensation used when a scaling ratio is 1 with the reference picture width or height equal to the current picture width or height.

At block 608 of the process 600, an encoding device 104 generates signaling for the filter coefficients using data for a selected filter. The encoding device 104 performing operations of block 608 for the process 600 can include details of the selected filter in a video bitstream and can store the video bitstream and/or send the video bitstream to the decoding device 112 over the communication link 120.

Table 1 above shows a set of filters and the coefficients for the filters. In some examples, filters can be fixed and provided to both the decoding device 112 and the encoding device 104. In such examples, the encoding device 104 does not to signal a fixed filter in a video bitstream, and may signal an indication (e.g., an index) of which filter to use. If the filters in table 1 are selected to be used and they are not fixed, however, the filter data (e.g., one or more filter coefficients) can be included in the video bitstream. Due to properties of the filters, all of the filter data does not need to be directly included in the video bitstream. Instead, certain coefficients can be excluded from the video bitstream (e.g., not included in the video bitstream). The excluded coefficients can be derived by the decoding device 112 based on the filter characteristics as described below. Table 3 illustrates aspects of filter data that can be signaled and used by the decoding device 112 to derive a complete filter.

TABLE 3

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 4 | −2 | 1 | 0 | |
| 2 | −1 | 2 | −5 | 8 | −3 | 1 | 0 | |
| 3 | −1 | 3 | −8 | 13 | −4 | 1 | 0 | |
| 4 | −1 | 4 | −10 | 17 | −5 | 1 | 0 | |
| 5 | −1 | 4 | −11 | 26 | −8 | 3 | −1 | |
| 6 | −1 | 3 | −9 | 31 | −10 | 4 | −1 | |
| 7 | −1 | 4 | −11 | 34 | −10 | 4 | −1 | |
| 8 | −1 | 4 | −11 | | | | | |
| (hpelIfIdx == 0) | | | | | | | | |

TABLE 3-continued

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 8 (hpelIfIdx == 1) | 0 | 3 | 9 | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |

Table 3 is a duplicate of table 1, but with the coefficients that are excluded from the encoded video bitstream when a given filter is signaled being removed from the table. These excluded coefficients can be derived from the remaining coefficients in the encoded video bitstream.

In some examples, a norm of the filter (e.g., a sum of all filter coefficients) may be signaled by the encoding device 104 per component or may be fixed. In some examples, a norm of 64 is used for luma and chroma filters. In such examples, since the norm of the filter is known, one coefficient of the filter may not be signaled. In such examples where the norm of the filter is known, the coefficient that is not signaled can be derived by the decoding device 112 as the norm minus a sum of the other coefficients of the same filter. In some examples, the system 100 can be configured by a designer to have different coefficients selected as the coefficient to be excluded. In some examples, the encoding device 104 excludes (e.g., selects the derived coefficient) the coefficient having the largest value. For example, the encoding device 104 can select a coefficient with index filterLength/2−1 to exclude from the signaled data when the coefficient at that index is the largest value. In other examples, the encoding device 104 can exclude coefficients based on other criteria.

The combination of norm signaling and filter characteristics determines the coefficients in Table 3. The filters for fractional sample positions 1-7, for example, have a non-symmetrical characteristic, and so seven of the eight coefficients are configured to be signaled when one of the filters for these fractional sample positions is selected. The eighth coefficient is not signaled, and can be derived from the other seven coefficients which are signaled. The largest value coefficient can be selected to be excluded from the signaling data to reduce the data signaled by the greatest amount. The filter at fractional sample position 6 in table 1 includes the coefficient values −1, 4, −10, 31, 47, −9, 3, and −1. The sum of these values gives a norm value of 64. The seven values for the seven coefficients signaled with the norm value of 64 can be the coefficient values −1, 4, −10, 31, −9, 3, and −1, with the coefficient value 47 excluded. When the decoding device 112 receives the seven signaled coefficient values and the norm value, the decoding device 112 can derive the missing eighth value, which is the unsignaled value (e.g., 47). The position of the unsignaled value can be fixed within the filter (e.g., always the coefficient with at the position for (filterLength/2) −1 or any other position with a filter) or can be signaled.

As another example, the filter at fractional sample position 2 of table 2 includes coefficient values −2, 62, 4, and 0. The encoding device 104 can, in some examples, signal coefficients −2, 4, and 0 with the norm value of 64. The decoding device 112 can then derive the coefficient value of 62 and recreate the filter with the complete set of filter coefficients.

In another example, the half-pel (e.g., fractional sample position 8) filters of table 1 have a symmetrical characteristic. Because of the symmetrical characteristic, three of the eight coefficients can be signaled (e.g., (8/2)+1 coefficients are excluded as described below where (N/2)+1 coefficients of an N coefficient filter can be excluded for a symmetrical filter), the largest value can be derived, and four of the eight coefficients (which can be referred to as missing, excluded, or coefficients) can be inferred from the symmetrical characteristic by mirroring according to the symmetrical characteristic.

The remaining filters for fractional sample positions 9-15 can be derived by the decoding device 112 from the corresponding filters for fractional sample positions 1-7. In some examples such filters can be signaled directly by the encoding device 104, and in other examples, these filters can be derived by the decoding device 112 from signaling by the encoding device 104 of a corresponding filter for fractional sample positions 1-7 along with an indicator of a shift between the corresponding filter in the first half position (e.g., positions 1-7) to the derived second half position filter (e.g., positions 9-15). In some examples, the filter coefficient values for the second half can also be signaled by the encoding device 104. In such an example, the coefficient values shown in table 3 for these filters mirror the coefficients from table 1 (e.g., with the fL[p][3] coefficient excluded from the signaling).

The use of the symmetry property allows the encoding device 104 to signal only unique coefficients. In the example of Table 3, filters with the fraction index corresponding to 0.5 (equal to numFracs/2) have symmetric coefficients relative to the center (e.g., the symmetrical filter coefficients −1, 4, −11, 40, 40, −11, 4, −1 of the filter for hpelIfIdx=0), in which case only half of the coefficients may be signaled by the encoding device 104, (e.g., only coefficients −1, 4, −11, 40 of the filter for hpelIfIdx=0). Within the half of the coefficients that are signaled, one coefficient may be derived from the half norm. For example, the coefficient having the largest magnitude (e.g., 40, for filter for hpelIfIdx=0) can be derived from a signaled half norm value of 32 when the coefficients −1, 4, and −11 are signaled by the encoding device 104. The derivation can be considered as solving for the unsignaled (e.g., missing) coefficient when the sum of all coefficients (e.g. the norm) is signaled along with a subset of the coefficients (e.g., the subset excluding the largest coefficient value in the example above.) The second half filter coefficients (which can be referred to as missing coefficients), corresponding to the fraction index 0.5 (equal to numFracs/2) and higher, may be derived from the first half of the filter coefficients by applying mirroring. In the example above, coefficient values −1, 4, and −11 are signaled along with the norm value 32. The coefficient value 40 is derived from the signaled values, and the full set of coefficients (e.g., −1, 4, −11, 40, 40, −11, 4, −1) is derived by mirroring the first half of the coefficients after the coefficient value 40 is derived. Table 3 is an example for luma filter coefficients. The same process for excluding coefficients may be applied to chroma filters and the associated chroma filter coefficients.

In different examples, the number of filter coefficients and number of filters may be signaled by the encoding device 104 on a per component or may be fixed depending on the component. In some examples, a filter having a length of eight coefficients (e.g., an 8-tap filter) is used by a system (e.g., the system 100) for luma components and 4 coefficients (e.g., 4-tap) length filter is used by a system for chroma components. In one example, the number of filters or fractions, can be 16 for luma component and 32 for chroma components. In other examples, different numbers of coefficients can be used by a system for filters, including different numbers of coefficients for luma filters and different numbers of coefficients for chroma filters. Additionally, in some examples, different numbers of filters can be used by a system other than what is shown in the examples above (e.g., other numbers of filters than 16 filters for luma components and 32 filters for chroma components).

In some examples, the coefficient values can be signaled directly by the encoding device 104, so the values from table 3 are encoded directly into the encoded video bitstream as signaling data for a selected filter. In other examples, a system (e.g., the system 100) can use coefficient prediction. In such an example with coefficient prediction, rather than encoding the coefficients directly, the encoding device 104 can create the signaling data using a difference between the previously signaled filter coefficients and a set of filter coefficients for the filter selected for a current picture and reference picture combination. In such an example, the initial signaling data for the first signaled filter in an encoded video bitstream can include the coefficient values for the selected filter. After that, each subsequent signaled filter can be indicated using a difference between an absolute value of each coefficient of a currently signaled filter and the absolute value of each corresponding coefficient of the previously signaled filter, along with a coefficient sign. In another example, coefficient prediction can be performed in a system (e.g., by the encoding device 104 and the decoding device 112 of the system 100) between a coefficient with index [i] and an index [filterLength-1-i] (e.g., symmetrical prediction relative to a center of a filter). In other examples, a system can use other such coefficient prediction configurations.

In some examples, syntax elements to communicate the signaling data described above for filter signaling are structured by a system (e.g., the system 100) in a parameter set (e.g., VPS, SPS, PPS, APS, etc.). In such an example, an encoding device (e.g., the encoding device 104) can generate the parameter set, and a decoding device (e.g., the decoding device 112) can store the parameter set and access coefficients for filtering from the parameter set. In other examples, or in addition to the parameter set signaling, the syntax elements for filter signaling in the system are structured in a header (e.g., a slice header, a picture header, etc.). In other examples, the system can use block level communications for filter signaling to indicate which filters selected among the plurality of the signaled filters or fixed filters are applied to certain pictures.

In some examples, a system (e.g., the system 100) can use syntax elements which indicate whether signaled filters are applied to a regular motion compensation. In one example, a system signals the syntax element in PPS or in a slice header. In other examples, the system can use any syntax option described herein for such signaling. In some examples, a filter signaling process can be applied by a system to all color components, or can be applied to certain color components (e.g., only luma or only chroma components).

In one example, filter coefficients may be signaled in APS by the encoding device 104, and there can be multiple APS containing the filters. An APS index may be signaled by the encoding device, for example, in a slice header to indicate an APS with the filters to be used by the decoding device 112. In some examples, a new APS type is used by the encoding device 104 to indicate to the decoding device 112 that the APS contains filter coefficients for resampling and/or regular motion interpolation.

In some examples, signaling generated by an encoding device (e.g., the encoding device 104) for filter coefficients using the syntax elements above allows the coefficients to be stored and reused by both the encoding device and a corresponding decoding device (e.g., the decoding device 112). In some examples, a system provides syntax for identifying the signaled filter. In some examples a system (e.g., the system 100) can use a new APS type for filter signaling. In some such examples, the encoding device can use slice headers with a flag or other signaling to indicate to the decoding device that alternative filters are enabled via signaling. When such alternative signaled filters are enabled in a system, an identifier of the APS can be added to a bitstream by the encoding device to indicate to the decoding device which parameter set the coefficients for a filter are from. The identifier of the APS can also indicate which particular current picture and reference picture pair are associated with the filter stored in the parameter set. The APS used to by the encoding device to signal the filter coefficients can further be used to store the filter data at the decoding device, with the APS identifier used to access the filter data when needed. In some such examples, the system uses separate flags for luma and chroma filters. In some examples, a system can identify coefficients for the luma and chroma filters with a sign or signal within an APS. The above describes a specific example with APS used to signal and store coefficients. In other examples, a system can use other signaling or parameter sets as described above. In some examples, the decoding device or the encoding device can store the signaled filters for any amount of time to be reused in any part of the video data. Subsequent current picture and reference picture combinations can be identified by the encoding device or the encoding device to with a syntax element referencing the signaled filter (e.g., an APS identifier). The encoding device can then signal an identifier, and the decoding device can use the identifier to access the previously signaled filter rather than the system resending the data (e.g., coefficients) from the encoding device to the decoding device for the signaled filter. In some examples, the signaled filters can be reused by a system for a set grouping of data (e.g., a picture or multiple pictures) and removed from the system when the set grouping of data has been processed by the system. The system can then re-signal the same signaled filter for a later grouping of data (e.g., a subsequent picture or set of pictures) if the encoding device determines that the same signaled filter provides improved performance for the later grouping.

As discussed above, in some examples, the usage of the filters may be derived based on the reference picture and current picture resolutions (e.g., the scaling ratio). In some such examples, if all reference pictures have the same size as the current picture, a decoding device (e.g., the decoding device 112) can use the signaled filters for motion compensation. In some examples, if there is a reference picture with a different size from the current picture (e.g., the scaling ratio is not 1), the signaled filters are applied by the decoding device for downsampling, and the existed motion compensation filters are applied for other cases. In some examples, if there is a reference picture with a larger size from the current picture (e.g., the scaling ratio is less than 1), the signaled filters are applied by the decoding device for downsampling, and the existed motion compensation filters are applied for other cases.

Returning to the details of the process 600, once the encoding device 104 selects a filter and the data for the signaled filter is generated at block 608, the signaling is included with an encoded video bitstream that is communicated across the communication link 120. As shown at block 630 of the process 600, this video bitstream is communicated from the encoding device 104 on the encoding side 601 to the decoding device 112 on the decoding side 649 (e.g., using the communication link 120)

At block 650 of the process 600, the decoding device (e.g., the decoding device 112) receives the encoded video bitstream. At block 652, the decoding device processes the encoded video bitstream, and identifies filter data. The filter data can be coefficients and norm data stored in an APS or any other such filter data in any syntax described above. The filter data can also include flags used to identify additional filter data, such as a flag indicating that signaled filters are enabled and some signaling data (e.g., coefficient or norm values) will be stored in an APS. The filter data can also include an identifier for an APS that includes the coefficients for a filter to be used with a particular current picture and reference picture. The filter data can be, in some examples, any data described above in the context of generating signaling by the encoding device 104.

Once the filter data is identified by the decoding device from the encoded video bitstream, the identified filter data can be used by the decoding device to derive any additional filter coefficients based on characteristics of the filter at block 654. The derivation can include deriving a largest value coefficient from a signaled norm value. The derivation can also include identifying unsignaled (e.g., excluded or missing) coefficients for symmetrical filters.

Once the decoding device determines all coefficients for a signaled filter, both from direct identification from the bitstream and from derived values, the filter can be used by the decoding device to process current pictures with reference pictures at block 656. In some examples, the filter can be used by the decoding device based on an APS identifier. The APS identifier can be associated with the current picture block to be filtered by signaling or syntax in the video bitstream from the encoding device, and the filter coefficients can be accessed from the APS by the decoding device when the picture processing occurs at the decoding device. In other examples, other operations can be used for processing a picture using a signaled filter.

In some such examples, the encoding device can signal multiple filter sets once per bitstream in different APSs, and the signaled filters can be used by the decoding device for any number of current pictures during operations of the decoding device 112. In such an example, each signaled filter is communicated once by the encoding device (e.g., the encoding device 104), and stored at the decoding device (e.g., the decoding device 112). In some examples, the encoded video bitstream includes an indication for each current picture of whether a signaled or fixed filter is to be applied. If a signaled filter is to be applied by the decoding device, identifying information for the filter (e.g., an APS identifier) can be provided by the encoding device as well.

In some examples, the encoding device sends data for signaled filters once per picture or once per slice in a slice heading. In some examples, the encoding device communicates signaling data at a block level. In some examples, the encoding device communicates data for signaled filters as needed within the encoded video bitstream. In some examples, other such signaling frequency can be used by the system to allow signaled filters to be available to the decoding device as needed.

After the video bitstream is processed by the decoding device, including one or more pictures processed with a signaled filter as described above, the video is output to a video destination device (e.g., the destination video device 122). As described above, the use of signaled filters can enable improved efficiency for the encoding device 104 and the decoding device 112, and can enable improved video quality at the video destination device, such as through reduced aliasing in the output video.

Figure 7A:
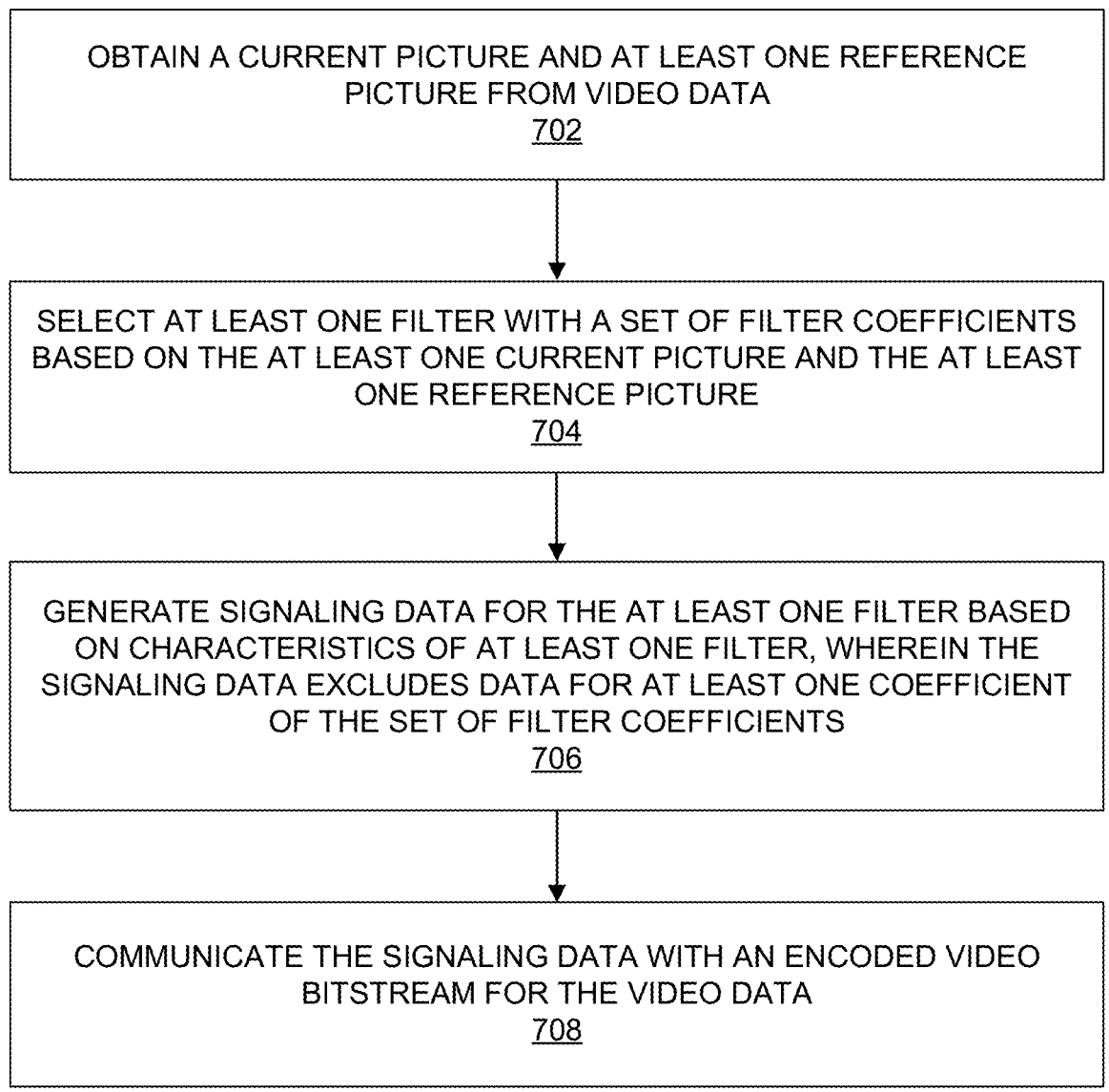
FIG. 7A is a flowchart illustrating a process of signaling filters for reference picture resampling, in accordance with examples described herein.

FIG. 7A is a flowchart illustrating a process 700 of signaling filters for reference picture resampling in accordance with examples described herein. In some examples, the process 700 can be performed by the encoding device 104. In some examples, the process 750 can be embodied as instructions in a computer readable storage medium that, when executed by processing circuitry of a device, causes the device to perform the operations of the process 700.

At block 702, the process 700 includes operations to obtain a current picture and at least one reference picture from video data. The video data can be received at the decoding device 112 from the video source 102, with the encoding device 104 configured to create an encoded video bitstream in accordance with a video processing standard as described above (e.g., VVC, etc.)

At block 704, the process 700 includes operations to select at least one filter with a set of filter coefficients based on the at least one current picture and the at least one reference picture. Different filter selections for processing the video data can select different filters based on different criteria in different examples.

In accordance with the process 700 and the examples described herein, at least one filter selected during video data processing is a signaled filter, with parts of the signaled filter to be communicated directly to the decoding device 112, and other parts of the signaled filter to be derived from the directly communicated portions.

At block 706, the process 700 includes operations to generate signaling data for the at least one filter based on characteristics of at least one filter. The operations can include a symmetrical characteristic, or a non-symmetrical characteristic. In either case, the signaling data excludes data for at least one coefficient of the set of filter coefficients. For a non-symmetrical filter, the excluded data can be a single coefficient excluded due to the inclusion of norm data with the signaling data. In a symmetrical filter, the excluded data can be half the coefficients, plus the exclusion of an additional coefficient that can be derived from a norm value (e.g., for N coefficients, the signaling data can exclude data for (N/2)+1 coefficients for filters with an even number of coefficients). In some examples, the signaling data can include additional information, such as flags to indicate operating configurations, identifiers for filter data (e.g., an APS identifier for a certain filter), flags indicating certain filters are to be applied for certain pictures, or other such information.

In some examples, generating the signaling data includes storing coefficient data for the at least one filter in an adaptation parameter set (APS). In some examples, the coefficient data includes a plurality of coefficients for the at least one filter and a norm value for all coefficients of a first filter. In some examples, the coefficient data includes a difference between an absolute value of each coefficient of the set of filter coefficients and an absolute value of corresponding previously signaled coefficients. In some examples, communicating the signaling data includes communicating the signaling data as part of a picture header in the encoded video bitstream for the video data. In some examples, communicating the signaling data includes communicating the signaling data as part of a slice header in the encoded video bitstream for the video data. In some examples, the signaling data can be generated according to other various syntax structures, using other parameter sets, header syntax structures, or data configurations.

At block 708, the process 700 includes operations to communicate the signaling data with an encoded video bitstream for the video data. In some examples, the operations can include communicating the encoded video bitstream to the decoding device 112 via the communication link 120, or other such communications. In some examples, rather than communicating the encoded video bitstream directly to the video destination device 122 with the decoding device 112, the encoded video bitstream can be stored by a device in a storage medium (e.g., a memory device) for later decoding and display.

In some examples, at least one reference picture includes a first reference picture associated with a first size, and the current picture is associated with a second size different than the first size, where the at least one reference picture includes a second reference picture.

In some examples, decoding and encoding devices can process video data using both signaled filters and fixed filters. In some such examples, the signaling data includes a plurality of sets of data for a plurality of filters, where a first filter of the plurality of filters is associated with the first reference picture, and where a second filter of the plurality of filters is associated with the second reference picture. In some such examples, the second reference picture is associated with a third size larger than the second size, and the first size is smaller than the second size. Some examples can operate by communicating a fixed filter signal for a fixed filter different than the at least one filter along with the signaling data, with the fixed filter is associated with the second reference picture and the second reference picture is associated with the second size.

In some examples, the process 700 can further include operations to generate a reference picture resampling flag indicating that the signaling data includes coefficient data for the at least one filter. Some such examples can include operations to communicate the reference picture resampling flag in a picture parameter set (PPS) as part of the encoded video bitstream for the video data. Some examples can include operations to communicate the reference picture resampling flag in a slice header as part of the encoded video bitstream for the video data.

In some examples, the at least one filter includes a luma filter. In some examples, the at least one filter includes a chroma filter. In some such examples, a set of chroma coefficients for the chroma filter includes four coefficients, and a set of luma coefficients for the luma filter includes eight coefficients. In other examples, other filter configurations can be used.

In some examples, multiple filters can be signaled, and both fixed and signaled filters can be indicated for different picture processing, depending on the characteristics of the picture to be processed and the one or more associated reference pictures. In some examples, process 700 can include operations to select a plurality of filters, each filter of the plurality of filters having a corresponding set of filter coefficients. Some examples can include operations to generate additional signaling data for the plurality of filters, where the additional signaling data excludes data for at least one coefficient of each filter of the plurality of filters, and communicate the additional signaling data with an encoded video bitstream for the video data. In some examples, the additional signaling data can include an APS for each filter of the plurality of filters in some examples. In some examples, the APSs are communicated separately. In other examples, the APSs can be signaled together. Some examples of such APSs can be configured where each corresponding APS includes an APS type indicating a corresponding filter type. The APS type can include a resampling type or a regular motion interpolation type in some examples. In some examples, each corresponding APS is signaled on a per component basis.

Figure 7B:
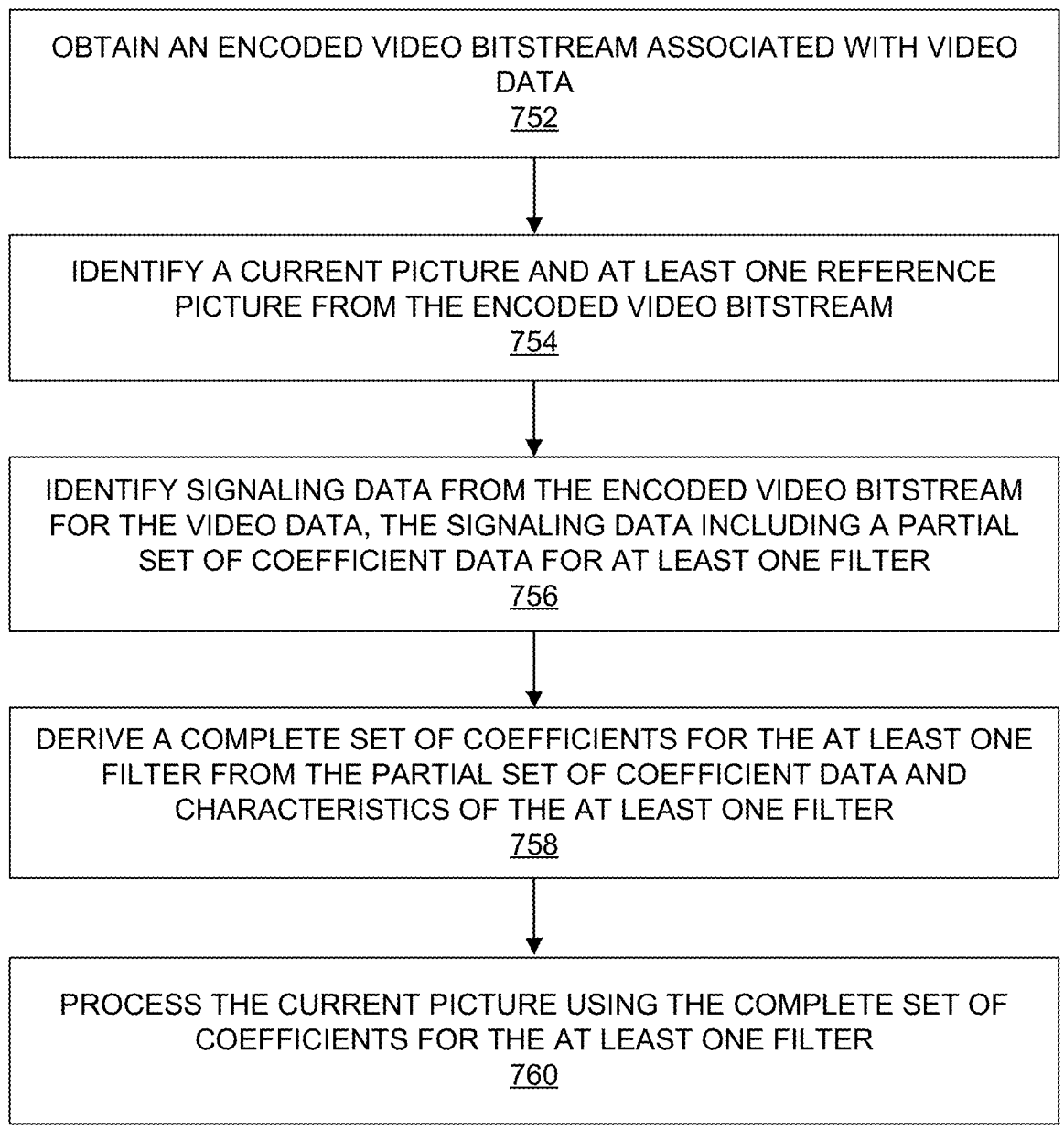
FIG. 7B is a flowchart illustrating a process of signaling filters for reference picture resampling, in accordance with examples described herein.

FIG. 7B is a flowchart illustrating a process 750 of signaling filters for reference picture resampling in accordance with examples described herein. The process 750 can be a corresponding method to the process 700 performed by the decoding device 112 connected to the encoding device 104 via the communication link 120. In some examples, the process 750 can be embodied as instructions in a computer readable storage medium that, when executed by processing circuitry of a device, causes the device to perform the operations of the process 750.

At block 752, the process 700 includes operations to obtain an encoded video bitstream associated with video data. In some examples, the video bitstream is received from the encoding device 104 at the decoding device 112 via the communication link 120. The video bitstream can include signaling data for signaling filters in accordance with any examples described above, such as coefficient data signaled in a parameter set as part of the bitstream, flag data that alerts the decoding device 112 to the presence of data for a signaled filter, or any other such signaling data for a signaled filter.

At block 754, the process 700 includes operations to identify a current picture and at least one reference picture from the encoded video bitstream. The current picture and the reference picture can be identified by the decoding device during standardized video processing (e.g., VVC, HEVC, AVC, etc.) operations for filtering, such as filtering associated with RPR, as described above.

At block 756, the process 700 includes operations to identify signaling data from the encoded video bitstream for the video data, the signaling data including a partial set of coefficient data for at least one filter. In some examples, the decoding device performing the operations can additionally identify syntax elements that match the current picture and the at least one reference picture with the at least one filter. In other examples, this match occurs after the complete set of coefficients for the filter have been derived (as described below with respect to block 758).

At block 758, the process 700 includes operations to derive a complete set of coefficients (or filter coefficients) for the at least one filter from the partial set of coefficient data and characteristics of the at least one filter. In some examples, the derivation operations can include operations for deriving a single excluded coefficient using a norm value. In some examples, the derivation operations can include operations for deriving multiple coefficient values based on a symmetrical property of a filter. In some examples, both the norm and symmetry derivations can be used for a single filter.

At block 760, the process 700 includes operations to process the current picture using the complete set of coefficients for the at least one filter. The operations to process the picture can include any operations needed to match the current picture, the reference picture, and the filter not yet performed by a decoding device. In some examples, the filter can be signaled prior to the current picture, and the coefficients for the at least one filter can be derived before any data for the current picture is received at the decoding device. In some such examples, signaling from the encoding device with a filter identifier can be processed as part of operations of block 760, and the current picture and reference picture can be used by the decoding device to access the filter coefficients using the filter identifier. In some examples, the filter coefficients are stored in an APS having an associated APS identifier. The APS identifier is associated with the current picture and the reference picture. The decoding device can fetch the filter coefficients using the APS identifier when the decoding device is ready to process the current picture and the reference picture. In other examples, other such operations for storing and accessing the signaled filter can be used. In some examples, the filter coefficients can be stored as received (e.g., as an incomplete set of coefficients with a norm value), and the full set of filter coefficients can be derived only when a current picture is to be processed with the signaled filter. In some such examples, incomplete filter coefficients can be signaled once, and then the full set of coefficients can be derived multiple times (e.g., each time a new current picture is to be processed with the signaled filter). In other examples, the filter coefficients can be re-signaled each time they are to be used in a system. In other examples, different combinations of signaling can be used with different groupings of data as described above.

Following the operations of block 760, the video data generated using at least one signaled filter as described above can be output to the video destination device 122.

In some implementations, the processes (or methods) described herein can be performed by a computing device or an apparatus, such as the system 100 shown in FIG. 1. For example, the processes can be performed by the encoding device 104 shown in FIG. 1 and FIG. 8, by another video source-side device or video transmission device, by the decoding device 112 shown in FIG. 1 and FIG. 9, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of the process 700.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., the system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. In some examples, the data connection may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 8:
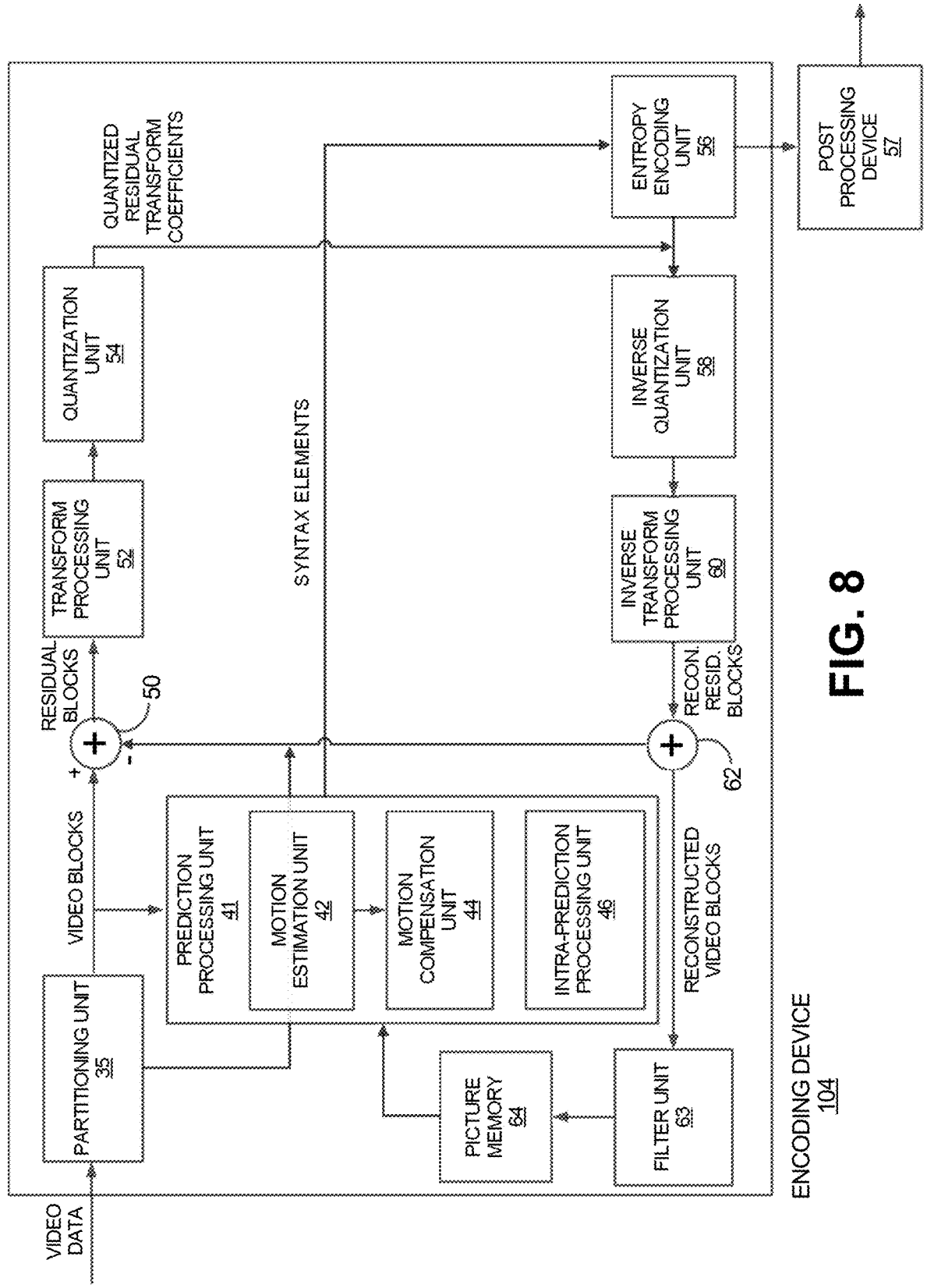
FIG. 8 is a block diagram illustrating an example video encoding device, in accordance with some examples.
Figure 9:
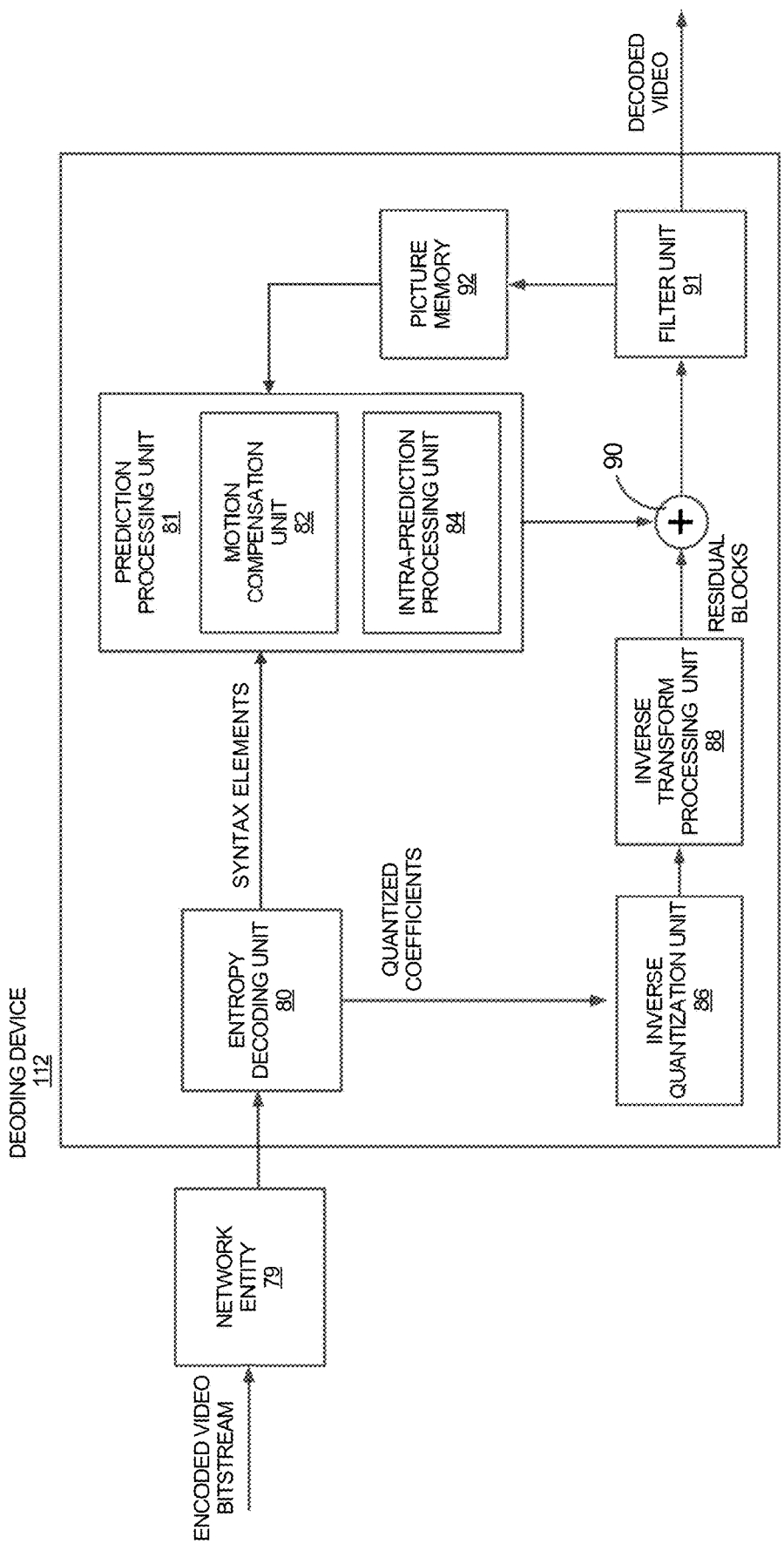
FIG. 9 is a block diagram illustrating an example video decoding device, in accordance with some examples.

Specific details of the encoding device 104 and the decoding device 112 are shown in FIG. 8 and FIG. 9, respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, a prediction processing unit 41, a filter unit 63, a picture memory 64, a summer 50, a transform processing unit 52, a quantization unit 54, and an entropy encoding unit 56. The prediction processing unit 41 includes a motion estimation unit 42, a motion compensation unit 44, and an intra-prediction processing unit 46. For video block reconstruction, the encoding device 104 also includes inverse a quantization unit 58, an inverse transform processing unit 60, and a summer 62. The filter unit 63 is intended to represent one or more loop filters such as a deblocking filter, an adaptive loop filter (ALF), and a sample adaptive offset (SAO) filter. Although the filter unit 63 is shown in FIG. 8 as being an in loop filter, in other configurations, the filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by the post processing device 57.

As shown in FIG. 8, the encoding device 104 receives video data, and the partitioning unit 35 partitions the data into video blocks. The partitioning may also include partitioning into slices, slice segments, tiles, or other larger units, as wells as video block partitioning, (e.g., according to a quadtree structure of LCUs and CUs). The encoding device 104 generally illustrates the components that encode video blocks within a video slice to be encoded. The slice may be divided into multiple video blocks (and possibly into sets of video blocks referred to as tiles). The prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). The prediction processing unit 41 may provide the resulting intra- or inter-coded block to the summer 50 to generate residual block data and to the summer 62 to reconstruct the encoded block for use as a reference picture.

Intra-prediction processing unit 46 within the prediction processing unit 41 may perform intra-prediction coding of the current video block relative to one or more neighboring blocks in the same frame or slice as the current block to be coded to provide spatial compression. A motion estimation unit 42 and a motion compensation unit 44 within the prediction processing unit 41 perform inter-predictive coding of the current video block relative to one or more predictive blocks in one or more reference pictures to provide temporal compression.

The motion estimation unit 42 may be configured to determine the inter-prediction mode for a video slice according to a predetermined pattern for a video sequence. The predetermined pattern may designate video slices in the sequence as P slices, B slices, or GPB slices. The motion estimation unit 42 and the motion compensation unit 44 may be highly integrated, but are illustrated separately for conceptual purposes. Motion estimation, performed by the motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in the picture memory 64. For example, the encoding device 104 may interpolate values of one-quarter pixel positions, one-eighth pixel positions, or other fractional pixel positions of the reference picture. Therefore, the motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the picture memory 64. The motion estimation unit 42 sends the calculated motion vector to the entropy encoding unit 56 and the motion compensation unit 44.

Motion compensation, performed by the motion compensation unit 44, may involve fetching or generating the predictive block based on the motion vector determined by motion estimation, possibly performing interpolations to sub-pixel precision. Upon receiving the motion vector for the PU of the current video block, the motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. The summer 50 represents the component or components that perform this subtraction operation. The motion compensation unit 44 may also generate syntax elements associated with the video blocks and the video slice for use by the decoding device 112 in decoding the video blocks of the video slice.

An intra-prediction processing unit 46 may intra-predict a current block, as an alternative to the inter-prediction performed by the motion estimation unit 42 and the motion compensation unit 44, as described above. In particular, the intra-prediction processing unit 46 may determine an intra-prediction mode to use to encode a current block. In some examples, the intra-prediction processing unit 46 may encode a current block using various intra-prediction modes, (e.g., during separate encoding passes,) and the intra-prediction processing unit 46 may select an appropriate intra-prediction mode to use from the tested modes. For example, the intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. The intra-prediction processing unit 46 may calculate ratios from the distortions and rates for the various encoded blocks to determine which intra-prediction mode exhibits the best rate-distortion value for the block.

In any case, after selecting an intra-prediction mode for a block, the intra-prediction processing unit 46 may provide information indicative of the selected intra-prediction mode for the block to an entropy encoding unit 56. The entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After the prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to a transform processing unit 52. The transform processing unit 52 transforms the residual video data into residual transform coefficients using a transform, such as a discrete cosine transform (DCT) or a conceptually similar transform. The transform processing unit 52 may convert the residual video data from a pixel domain to a transform domain, such as a frequency domain.

The transform processing unit 52 may send the resulting transform coefficients to a quantization unit 54. The quantization unit 54 quantizes the transform coefficients to further reduce bit rate. The quantization process may reduce the bit depth associated with some or all of the coefficients. The degree of quantization may be modified by adjusting a quantization parameter. In some examples, the quantization unit 54 may perform a scan of the matrix including the quantized transform coefficients. Alternatively, the entropy encoding unit 56 may perform the scan.

Following quantization, the entropy encoding unit 56 entropy encodes the quantized transform coefficients. For example, the entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by the entropy encoding unit 56, the encoded bitstream may be transmitted to the decoding device 112, or archived for later transmission or retrieval by the decoding device 112. The entropy encoding unit 56 may also entropy encode the motion vectors and the other syntax elements for the current video slice being coded.

An inverse quantization unit 58 and an inverse transform processing unit 60 apply inverse quantization and inverse transformation, respectively, to reconstruct the residual block in the pixel domain for later use as a reference block of a reference picture. A motion compensation unit 44 may calculate a reference block by adding the residual block to a predictive block of one of the reference pictures within a reference picture list. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reference block for storage in the picture memory 64. The reference block may be used by the motion estimation unit 42 and the motion compensation unit 44 as a reference block to inter-predict a block in a subsequent video frame or picture.

In this manner, the encoding device 104 of FIG. 8 represents an example of a video encoder configured to perform any of the techniques described herein, including the processes described above. In some cases, some of the techniques of this disclosure may also be implemented by the post processing device 57.

FIG. 9 is a block diagram illustrating an example decoding device 112. The decoding device 112 includes an entropy decoding unit 80, a prediction processing unit 81, an inverse quantization unit 86, an inverse transform processing unit 88, a summer 90, a filter unit 91, and a picture memory 92. The prediction processing unit 81 includes a motion compensation unit 82 and an intra prediction processing unit 84. The decoding device 112 may, in some examples, perform a decoding pass generally reciprocal to the encoding pass described with respect to the encoding device 104 from FIG. 8.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. The network entity 79 may or may not include the encoding device 104. Some of the techniques described in this disclosure may be implemented by the network entity 79 prior to the network entity 79 transmitting the encoded video bitstream to the decoding device 112. In some video decoding systems, the network entity 79 and the decoding device 112 may be parts of separate devices, while in other instances, the functionality described with respect to the network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to the prediction processing unit 81. The decoding device 112 may receive the syntax elements at the video slice level and/or the video block level. The entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, the motion compensation unit 82 of the prediction processing unit 81 produces predictive blocks for a video block of the current video slice based on the motion vectors and other syntax elements received from the entropy decoding unit 80. The predictive blocks may be produced from one of the reference pictures within a reference picture list. The decoding device 112 may construct the reference frame lists, List 0 and List 1, using default construction techniques based on reference pictures stored in the picture memory 92.

The motion compensation unit 82 determines prediction information for a video block of the current video slice by parsing the motion vectors and other syntax elements, and uses the prediction information to produce the predictive blocks for the current video block being decoded. For example, the motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

The motion compensation unit 82 may also perform interpolation based on interpolation filters. The motion compensation unit 82 may use interpolation filters as used by the encoding device 104 during encoding of the video blocks to calculate interpolated values for sub-integer pixels of reference blocks. In this case, the motion compensation unit 82 may determine the interpolation filters used by the encoding device 104 from the received syntax elements, and may use the interpolation filters to produce predictive blocks.

The inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After the motion compensation unit 82 generates the predictive block for the current video block based on the motion vectors and other syntax elements, the decoding device 112 forms a decoded video block by summing the residual blocks from the inverse transform processing unit 88 with the corresponding predictive blocks generated by the motion compensation unit 82. The summer 90 represents the component or components that perform this summation operation. If desired, loop filters (either in the coding loop or after the coding loop) may also be used to smooth pixel transitions, or to otherwise improve the video quality. The filter unit 91 is intended to represent one or more loop filters such as a deblocking filter, an adaptive loop filter (ALF), and a sample adaptive offset (SAO) filter. Although the filter unit 91 is shown in FIG. 9 as being an in loop filter, in other configurations, the filter unit 91 may be implemented as a post loop filter. The decoded video blocks in a given frame or picture are stored in the picture memory 92, which stores reference pictures used for subsequent motion compensation. The picture memory 92 also stores decoded video for later presentation on a display device, such as the video destination device 122 shown in FIG. 1.

In this manner, the decoding device 112 of FIG. 9 represents an example of a video decoder configured to perform any of the techniques described herein, including the processes described above.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. While illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1. A method of decoding video data, the method comprising: obtaining an encoded video bitstream; obtaining a current picture of the encoded video bitstream; determining a size of the current picture relative to a size of at least one reference picture; determining whether a first filter or a second filter is applicable to one or more samples of the at least one reference picture based on the size of the current picture relative to the size of the at least one reference picture, wherein the first filter is signaled in the encoded video bitstream and the second filter is fixed filter; and applying the first filter or the second filter to the one or more samples of the at least one reference picture.

Example 2. The method of example 1, wherein the first filter includes a first interpolation filter and wherein the second filter includes a second interpolation filter.

Example 3. The method of any one of examples 1 to 2, further comprising: applying the first filter when a width of the at least one reference picture is greater than a width of the current picture.

Example 4. The method of any one of examples 1 to 3, further comprising: applying the first filter when a height of the at least one reference picture is greater than a height of the current picture.

Example 5. The method of any one of examples 1 to 2, further comprising: applying the first filter when a width of the at least one reference picture is less than a width of the current picture.

Example 6. The method of any one of examples 1 to 5, further comprising: applying the first filter when a height of the at least one reference picture is less than a height of the current picture.

Example 7. The method of any one of examples 1 to 2, further comprising: applying the first filter when a width of the at least one reference picture is equal to a width of the current picture.

Example 8. The method of any one of examples 1 to 7, further comprising: applying the first filter when a height of the at least one reference picture is equal to a height of the current picture.

Example 9. The method of any one of examples 1 to 8, wherein the fixed filter is not signaled in the encoded video bitstream.

Example 10. The method of any one of examples 1 to 9, further comprising: applying the first filter to all components of the at least one reference picture.

Example 11. The method of any one of examples 1 to 9, further comprising: applying the first filter to luma components of the at least one reference picture.

Example 12. The method of example 11, wherein the first filter is not applied to chroma components of the at least one reference picture.

Example 13. The method of any one of examples 1 to 12, further comprising:

obtaining, from the encoded video bitstream, a parameter set including filter coefficients of the first filter; and applying the first filter to the one or more samples of the at least one reference picture using the filter coefficients.

Example 14. The method of example 13, wherein the parameter set includes an adaptation parameter set (APS).

Example 15. The method of any one of example 13 or 14, further comprising: selecting, using an APS index, the parameter set from a plurality of parameter sets included in the encoded video bitstream.

Example 16. An apparatus comprising a memory configured to store video data and a processor configured to process the video data according to any of examples 1 to 15.

Example 17. The apparatus of example 16, wherein the apparatus includes a decoder.

Example 18. The apparatus of any one of examples 16 to 17, wherein the apparatus is a mobile device.

Example 19. The apparatus of any one of examples 16 to 18, further comprising a display configured to display the video data.

Example 20. The apparatus of any one of examples 16 to 19, further comprising a camera configured to capture one or more pictures.

Example 21. A computer readable medium having stored thereon instructions that when executed by a processor perform the methods of any of examples 1 to 15.

Example 22. A method of encoding video data, the method comprising: obtaining a current picture of video data; determining a size of the current picture relative to a size of at least one reference picture; determining to signal a first filter in an encoded video bitstream; determining whether the first filter or a second filter is applicable to one or more samples of the at least one reference picture based on the size of the current picture relative to the size of the at least one reference picture, wherein the second filter is fixed filter; applying the first filter or the second filter to the one or more samples of the at least one reference picture; and generating the encoded video bitstream including the first filter.

Example 23. The method of example 22, wherein the first filter includes a first interpolation filter and wherein the second filter includes a second interpolation filter.

Example 24. The method of any one of examples 22 to 23, further comprising: applying the first filter when a width of the at least one reference picture is greater than a width of the current picture.

Example 25. The method of any one of examples 22 to 24, further comprising: applying the first filter when a height of the at least one reference picture is greater than a height of the current picture.

Example 26. The method of any one of examples 22 to 23, further comprising: applying the first filter when a width of the at least one reference picture is less than a width of the current picture.

Example 27. The method of any one of examples 22 to 26, further comprising: applying the first filter when a height of the at least one reference picture is less than a height of the current picture.

Example 28. The method of any one of examples 22 to 23, further comprising: applying the first filter when a width of the at least one reference picture is equal to a width of the current picture.

Example 29. The method of any one of examples 22 to 28, further comprising: applying the first filter when a height of the at least one reference picture is equal to a height of the current picture.

Example 30. The method of any one of examples 22 to 29, wherein the fixed filter is not signaled in the encoded video bitstream.

Example 31. The method of any one of examples 22 to 30, further comprising: applying the first filter to all components of the at least one reference picture.

Example 32. The method of any one of examples 22 to 30, further comprising: applying the first filter to luma components of the at least one reference picture.

Example 33. The method of example 32, wherein the first filter is not applied to chroma components of the at least one reference picture.

Example 34. The method of any one of examples 22 to 33, further comprising: applying the first filter to the one or more samples of the at least one reference picture using filter coefficients of the first filter; and generating, for the encoded video bitstream, a parameter set including the filter coefficients of the first filter.

Example 35. The method of example 34, wherein the parameter set includes an adaptation parameter set (APS).

Example 36. The method of any one of example 34 or 35, further comprising: generating, for the encoded video bitstream, an APS index indicating the parameter set from a plurality of parameter sets to signal the filter coefficients for the first filter.

Example 37. The method of any one of example 22 or 36, further comprising: storing the encoded video bitstream.

Example 38. The method of any one of example 22 or 37, further comprising: signaling the encoded video bitstream.

Example 39. An apparatus comprising a memory configured to store video data and a processor configured to process the video data according to any of examples 22 to 38.

Example 40. The apparatus of example 39, wherein the apparatus includes an encoder.

Example 41. The apparatus of any one of examples 39 to 40, wherein the apparatus is a mobile device.

Example 42. The apparatus of any one of examples 39 to 41, further comprising a display configured to display the video data.

Example 43. The apparatus of any one of examples 39 to 42, further comprising a camera configured to capture one or more pictures.

Example 44. A computer readable medium having stored thereon instructions that when executed by a processor perform the methods of any of examples 22 to 38.

Example 45. A method of coding video data, the method comprising: obtaining a current picture and at least one reference picture from the video data; selecting at least one filter with a set of filter coefficients based on the current picture and the at least one reference picture; generating signaling data for the at least one filter based on characteristics of the at least one filter, wherein the signaling data excludes data for at least one coefficient of the set of filter coefficients; and communicating the signaling data with an encoded video bitstream for the video data.

Example 46. The method of example 45, wherein generating the signaling data includes storing coefficient data for the at least one filter in an adaptation parameter set (APS).

Example 47. The method of example 46, wherein the coefficient data includes a plurality of coefficients for the at least one filter and a norm value for all coefficients of a first filter.

Example 48. The method of example 46, wherein the coefficient data includes a difference between an absolute value of each coefficient of the set of filter coefficients and an absolute value of corresponding previously signaled coefficients.

Example 49. The method of example 46, wherein communicating the signaling data includes communicating the signaling data as part of a picture header in the encoded video bitstream for the video data.

Example 50. The method of example 46, wherein communicating the signaling data includes communicating the signaling data as part of a slice header in the encoded video bitstream for the video data.

Example 51. The method of example 45, wherein the characteristics of at the least one filter include a non-symmetrical characteristic.

Example 52. The method of example 51, wherein the at least one coefficient of the set of filter coefficients excluded from the signaling data is a largest value coefficient of the set of filter coefficients.

Example 53. The method of example 45, wherein the characteristics of the at least one filter include a symmetrical characteristic.

Example 54. The method of example 53, wherein the set of filter coefficients includes N coefficients, and wherein the signaling data excludes data for (N/2)+1 coefficients of the set of filter coefficients from the signaling data.

Example 55. The method of example 45, wherein the at least one reference picture includes a first reference picture associated with a first size, wherein the current picture is associated with a second size different than the first size, and wherein the at least one reference picture includes a second reference picture.

Example 56. The method of example 55, wherein the signaling data includes a plurality of sets of data for a plurality of filters, wherein a first filter of the plurality of filters is associated with the first reference picture, and wherein a second filter of the plurality of filters is associated with the second reference picture.

Example 57. The method of example 56, wherein the second reference picture is associated with a third size larger than the second size, and wherein the first size is smaller than the second size.

Example 58. The method of example 56, further comprising: communicating a fixed filter signal for a fixed filter different than the at least one filter along with the signaling data; wherein the fixed filter is associated with the second reference picture; and wherein the second reference picture is associated with the second size.

Example 59. The method of example 45, further comprising generating a reference picture resampling flag indicating that the signaling data includes coefficient data for the at least one filter.

Example 60. The method of example 59, further comprising communicating the reference picture resampling flag in a picture parameter set (PPS) as part of the encoded video bitstream for the video data.

Example 61. The method of example 59, further comprising communicating the reference picture resampling flag in a slice header as part of the encoded video bitstream for the video data.

Example 62. The method of example 45, wherein the at least one filter includes a luma filter.

Example 63. The method of example 62, wherein the at least one filter includes a chroma filter, wherein a set of chroma coefficients for the chroma filter includes four coefficients, and wherein a set of luma coefficients for the luma filter includes eight coefficients.

Example 64. The method of example 45, wherein the signaling data is communicated at a block level.

Example 65. The method of example 45, further comprising: selecting a plurality of filters, each filter of the plurality of filters having a corresponding set of filter coefficients; generating additional signaling data for the plurality of filters, wherein the additional signaling data excludes data for at least one coefficient of each filter of the plurality of filters; and communicating the additional signaling data with the encoded video bitstream for the video data.

Example 66. The method of example 65, wherein generating the additional signaling data includes generating a corresponding adaptation parameter set (APS) for each filter of the plurality of filters.

Example 67. The method of example 66, wherein communicating the additional signaling data includes separately communicating each corresponding APS as part of the encoded video bitstream.

Example 68. The method of example 67, wherein each corresponding APS includes an APS type indicating a corresponding filter type.

Example 69. The method of example 68, wherein the corresponding filter type is a resampling type or a regular motion interpolation type.

Example 70. The method of example 66, wherein each corresponding APS is signaled on a per component basis.

Example 71. The method of example 45, wherein selecting the at least one filter with the set of filter coefficients is based on whether filtering in either a horizontal or a vertical directions or both for the current picture and the at least one reference picture is downsampling, upsampling, or regular motion compensation.

Example 72. A method of coding video data, the method comprising: obtaining an encoded video bitstream associated with the video data; identifying a current picture and at least one reference picture from the encoded video bitstream; identifying signaling data from the encoded video bitstream for the video data, the signaling data including a partial set of coefficient data for at least one filter; deriving a complete set of coefficients for the at least one filter from the partial set of coefficient data and characteristics of the at least one filter; and processing the current picture using the complete set of coefficients for the at least one filter.

Example 73. The method of example 72, wherein deriving the complete set of coefficients comprises calculating a filter norm using on the partial set of coefficient data; and wherein the characteristics of the at least one filter include a non-symmetrical filter characteristic.

Example 74. The method of example 72, wherein the characteristics of the at least one filter include a symmetrical filter characteristic, and wherein deriving the complete set of coefficients comprises determining a plurality of missing coefficients from the partial set of coefficient data by mirroring coefficients from the partial set of coefficient data and calculating a filter norm.

Example 75. The method of example 72, wherein the characteristics of the at least one filter include a fractional position characteristic; wherein deriving the complete set of coefficients comprises deriving fractional positions for missing coefficients and mirroring coefficients present in the partial set of coefficient data.

Example 76. A method of coding video data, the method comprising: obtaining an encoded video bitstream associated with the video data; identifying a current picture and at least one reference picture from the encoded video bitstream; identifying signaling data from the encoded video bitstream for the video data, the signaling data including a partial set of coefficient data for at least one filter; deriving a complete set of coefficients for the at least one filter from the partial set of coefficient data and characteristics of the at least one filter; and processing the current picture using the complete set of coefficients for the at least one filter.

Example 77. The method of example 76, wherein deriving the complete set of coefficients comprises utilizing a filter norm and values of signaled filter coefficients from the partial set of coefficient data; and wherein the characteristics of the at least one filter include a non-symmetrical filter characteristic.

Example 78. The method of example 76, wherein the characteristics of the at least one filter include a symmetrical filter characteristic, and wherein deriving the complete set of coefficients comprises determining a plurality of missing coefficients from the partial set of coefficient data by mirroring coefficients from the partial set of coefficient data and calculating a filter norm.

Example 79. The method of example 76, wherein the characteristics of the at least one filter include a fractional position characteristic; wherein deriving the complete set of coefficients comprises deriving fractional positions for missing coefficients and mirroring coefficients present in the partial set of coefficient data.

Example 80. The method of example 76, wherein the signaling data includes coefficient data for the at least one filter in an adaptation parameter set (APS).

Example 81. The method of example 80, wherein the partial set of coefficient data includes a plurality of coefficients for the at least one filter and a norm value for all coefficients of a first filter.

Example 82. The method of example 80, wherein the partial set of coefficient data includes a difference between an absolute value of each coefficient of the complete set of filter coefficients and an absolute value of corresponding previously signaled coefficients.

Example 83. The method of example 80, wherein the signaling data is obtained as part of a picture header in the encoded video bitstream for the video data.

Example 84. The method of example 80, wherein the signaling data is obtained as part of a slice header in the encoded video bitstream for the video data.

Example 85. The method of example 76, wherein the at least one reference picture includes a first reference picture associated with a first size, wherein the current picture is associated with a second size different than the first size, and wherein the at least one reference picture includes a second reference picture; wherein the signaling data includes a plurality of sets of data for a plurality of filters, wherein a first filter of the plurality of filters is associated with the first reference picture, and wherein a second filter of the plurality of filters is associated with the second reference picture; and wherein the second reference picture is associated with a third size larger than the second size, and wherein the first size is smaller than the second size.

Example 86. The method of example 76, further comprising identifying a reference picture resampling flag from the encoded video bitstream indicating that the signaling data includes coefficient data for the at least one filter; and identifying the reference picture resampling flag in a picture parameter set (PPS) as part of the encoded video bitstream for the video data.

Example 87. The method of example 76, further comprising identifying a corresponding adaptation parameter set (APS) for the at least one filter; wherein the corresponding APS is separately communicated for each filter; and wherein the corresponding APS includes an APS type indicating a corresponding filter type.

Example 88. An apparatus comprising a memory and one or more processors coupled to the memory, the one or more processors configured to perform the operations of any combination of the methods above.

Example 89. The apparatus of example 88, wherein the apparatus comprises a mobile device.

Example 90. A non-transitory computer readable medium comprising instructions that, when executed by one or more processors of a device, cause the device to perform the operations of any combination of the methods above.

Example 91. The non-transitory computer readable medium of example 90, wherein the device comprises a display.

Example 92. The non-transitory computer readable medium of example 90, wherein the device comprises a mobile device.

What is claimed is:

1. A method of decoding video data, the method comprising:
   obtaining an encoded video bitstream associated with the video data;
   identifying a current picture associated with a first size and at least one reference picture from the encoded video bitstream, the at least one reference picture including a first reference picture associated with a second size and a second reference picture associated with a third size, wherein the second size is smaller than the first size and the third size is larger than the first size;
   identifying signaling data from the encoded video bitstream for the video data, the signaling data including at least one partial set of coefficient data for at least a first filter associated with the first reference picture and a second filter associated with the second reference picture;
   deriving a complete set of coefficients for at least one of the first filter and the second filter from the at least one partial set of coefficient data and characteristics of the at least one of the first filter and the second filter; and
   processing the current picture using the complete set of coefficients for the at least one of the first filter and the second filter.

2. The method of claim 1, wherein deriving the complete set of coefficients comprises utilizing a filter norm and values of signaled filter coefficients from the at least one partial set of coefficient data, and wherein the characteristics of the at least one of the first filter and the second filter include a non-symmetrical filter characteristic.

3. The method of claim 1, wherein the characteristics of the at least one of the first filter and the second filter include a symmetrical filter characteristic, and wherein deriving the complete set of coefficients comprises determining a plurality of missing coefficients from the at least one partial set of coefficient data by mirroring coefficients from the at least one partial set of coefficient data.

4. The method of claim 1, wherein the characteristics of the at least one of the first filter and the second filter include a fractional position characteristic, and wherein deriving the complete set of coefficients comprises deriving fractional positions for missing coefficients and mirroring coefficients present in the at least one partial set of coefficient data.

5. The method of claim 1, wherein the signaling data includes coefficient data for the at least one of the first filter and the second filter in an adaptation parameter set (APS).

6. The method of claim 5, wherein the at least one partial set of coefficient data includes a plurality of coefficients for the at least one of the first filter and the second filter and a norm value for all coefficients of at least one of the first filter and the second filter.

7. The method of claim 5, wherein the at least one partial set of coefficient data includes a difference between an absolute value of each coefficient of the complete set of coefficients and an absolute value of corresponding previously signaled coefficients.

8. The method of claim 5, wherein the signaling data is obtained as part of a picture header in the encoded video bitstream for the video data.

9. The method of claim 5, wherein the signaling data is obtained as part of a slice header in the encoded video bitstream for the video data.

10. The method of claim 1, further comprising:
    identifying a reference picture resampling flag from the encoded video bitstream indicating that the signaling data includes coefficient data for the at least one of the first filter and the second filter; and
    identifying the reference picture resampling flag in a picture parameter set (PPS) as part of the encoded video bitstream for the video data.

11. The method of claim 1, further comprising:
    identifying a corresponding adaptation parameter set (APS) for the at least one of the first filter and the second filter, wherein the corresponding APS is separately communicated for each filter, and wherein the corresponding APS includes an APS type indicating a corresponding filter type.

12. An apparatus comprising:
    at least one memory; and
    one or more processors coupled to the at least one memory, the one or more processors being configured to:
       obtain an encoded video bitstream associated with video data;
       identify a current picture associated with a first size and at least one reference picture from the encoded video bitstream, the at least one reference picture including a first reference picture associated with a second size and a second reference picture associated with a third size, wherein the second size is smaller than the first size and the third size is larger than the first size;
       identify signaling data from the encoded video bitstream for the video data, the signaling data including at least one partial set of coefficient data for at least a first filter associated with the first reference picture and a second filter associated with the second reference picture;

derive a complete set of coefficients for at least one of the first filter and the second filter from the at least one partial set of coefficient data and characteristics of the at least one of the first filter and the second filter; and process the current picture using the complete set of coefficients for the at least one of the first filter and the second filter.

13. The apparatus of claim 12, wherein the one or more processors are configured to derive the complete set of coefficients by utilizing a filter norm and values of signaled filter coefficients from the at least one partial set of coefficient data, and wherein the characteristics of the at least one of the first filter and the second filter include a non-symmetrical filter characteristic.

14. The apparatus of claim 12, wherein the characteristics of the at least one of the first filter and the second filter include a symmetrical filter characteristic, and wherein the one or more processors are configured to derive the complete set of coefficients by determining a plurality of missing coefficients from the at least one partial set of coefficient data by mirroring coefficients from the at least one partial set of coefficient data.

15. The apparatus of claim 12, wherein the characteristics of the at least one of the first filter and the second filter include a fractional position characteristic, and wherein the one or more processors are configured to derive the complete set of coefficients by deriving fractional positions for missing coefficients and mirroring coefficients present in the at least one partial set of coefficient data.

16. The apparatus of claim 12, wherein the signaling data includes coefficient data for the at least one of the first filter and the second filter in an adaptation parameter set (APS).

17. The apparatus of claim 16, wherein the at least one partial set of coefficient data includes a plurality of coefficients for the at least one of the first filter and the second filter and a norm value for all coefficients of at least one of the first filter and the second filter.

18. The apparatus of claim 16, wherein the at least one partial set of coefficient data includes a difference between an absolute value of each coefficient of the complete set of coefficients and an absolute value of corresponding previously signaled coefficients.

19. The apparatus of claim 16, wherein the signaling data is obtained as part of a picture header in the encoded video bitstream for the video data.

20. The apparatus of claim 16, wherein the signaling data is obtained as part of a slice header in the encoded video bitstream for the video data.

21. The apparatus of claim 12, wherein the one or more processors are configured to:
identify a reference picture resampling flag from the encoded video bitstream indicating that the signaling data includes coefficient data for the at least one of the first filter and the second filter; and
identify the reference picture resampling flag in a picture parameter set (PPS) as part of the encoded video bitstream for the video data.

22. The apparatus of claim 12, wherein the apparatus is a mobile computing device.

23. A method of encoding video data, the method comprising:
obtaining a current picture associated with a first size and at least one reference picture from the video data, the at least one reference picture including a first reference picture associated with a second size and a second reference picture associated with a third size, wherein the second size is smaller than the first size and the third size is larger than the first size;

selecting at least one filter with at least one set of filter coefficients based on the current picture and the at least one reference picture, the at least one filter including at least a first filter associated with the first reference picture and a second filter associated with the second reference picture;

generating signaling data for the at least one filter based on characteristics of the at least one filter, wherein the signaling data excludes data for at least one coefficient of the set of filter coefficients; and communicating the signaling data with an encoded video bitstream for the video data.

24. The method of claim 23, wherein:
the characteristics of at the least one filter include a non-symmetrical characteristic;
the signaling data comprises a norm value generated from the set of filter coefficients, wherein the norm value is a sum of all filter coefficients; and
the at least one coefficient of the set of filter coefficients excluded from the signaling data is a largest value coefficient of the set of filter coefficients.

25. The method of claim 23, wherein:
the characteristics of the at least one filter include a symmetrical characteristic;
the set of filter coefficients includes N coefficients; and
the signaling data excludes data for (N/2)+1 coefficients of the set of filter coefficients from the signaling data.

26. An apparatus comprising:
at least one memory; and
one or more processors coupled to the at least one memory, the one or more processors being configured to:
obtain a current picture associated with a first size and at least one reference picture from video data, the at least one reference picture including a first reference picture associated with a second size and a second reference picture associated with a third size, wherein the second size is smaller than the first size and the third size is larger than the first size;
select at least one filter with at least one set of filter coefficients based on the current picture and the at least one reference picture, the at least one filter including at least a first filter associated with the first reference picture and a second filter associated with the second reference picture;
generate signaling data for the at least one filter based on characteristics of the at least one filter, wherein the signaling data excludes data for at least one coefficient of the set of filter coefficients; and
communicate the signaling data with an encoded video bitstream for the video data.

27. The apparatus of claim 26, wherein:
the characteristics of at the least one filter include a non-symmetrical characteristic;
the signaling data comprises a norm value generated from the set of filter coefficients, wherein the norm value is a sum of all filter coefficients; and
the at least one coefficient of the set of filter coefficients excluded from the signaling data is a largest value coefficient of the set of filter coefficients.

28. The apparatus of claim 26, wherein:
the characteristics of the at least one filter include a symmetrical characteristic;
the set of filter coefficients includes N coefficients; and
the signaling data excludes data for N/2+1 coefficients of the set of filter coefficients from the signaling data.

* * * * *